(12) United States Patent
Yuknewicz et al.

(10) Patent No.: US 7,673,286 B2
(45) Date of Patent: Mar. 2, 2010

(54) ARCHITECTURE FOR CONVERTING CONTROL TYPES IN A DATA BOUND USER INTERFACE

(75) Inventors: Paul J. Yuknewicz, Redmond, WA (US); Antoine Cote, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1053 days.

(21) Appl. No.: 10/768,496

(22) Filed: Jan. 30, 2004

(65) Prior Publication Data
US 2005/0172264 A1    Aug. 4, 2005

(51) Int. Cl.
*G06F 9/44* (2006.01)
*G06F 3/00* (2006.01)
(52) U.S. Cl. .................. 717/113; 717/109; 715/762
(58) Field of Classification Search .................. 717/113
See application file for complete search history.

(56) References Cited

U.S. PATENT DOCUMENTS

| | | | |
|---|---|---|---|
| 5,603,034 A * | 2/1997 | Swanson .................. | 717/111 |
| 5,642,511 A | 6/1997 | Chow et al. | |
| 5,911,075 A | 6/1999 | Glaser et al. | |
| 5,953,525 A | 9/1999 | Glaser et al. | |
| 6,430,556 B1 * | 8/2002 | Goldberg et al. .............. | 707/4 |
| 6,502,234 B1 * | 12/2002 | Gauthier et al. ............. | 717/107 |
| 6,564,375 B1 * | 5/2003 | Jiang .......................... | 717/165 |
| 6,633,888 B1 | 10/2003 | Kobayashi | |
| 6,686,937 B1 | 2/2004 | Cragun | |
| 2005/0033763 A1 * | 2/2005 | Chen et al. .................. | 707/102 |

OTHER PUBLICATIONS

P.J. Barclay et al., "Teallach—a flexible user-interface development environment for object database applications," Journal of Visual Languages & Computing, vol. 14, issue 1, Feb. 2003 (available online Jan. 28, 2003), pp. 44-77.*
Antti Martikainen, "An XML-based Framework for Developing Usable and Reusable User Interfaces for Multi-channel Applications," 2002, University of Helsinki, (109 pages).*
Susan Uskudarli. Generating visual editors for formally specified languages. In Proc. 1994 IEEE Symposium Visual Languages, Oct. 1994. 16 pages.
T. Griffiths, P.J. Barclay, N.W. Paton, J. Mckirdy, J. Kennedy, P.D. Gray, R. Cooper, C.A. Goble, P. Pinheiro Da Silva. Teallach: A Model-Based User Interface Development Environment for Object Databases. Interacting with Computers, vol. 14, No. 1, pp. 31-68, 2001.

* cited by examiner

*Primary Examiner*—James Rutten
(74) *Attorney, Agent, or Firm*—Workman Nydegger

(57) ABSTRACT

A mechanism for converting control types in a user interface (UI) development framework. The framework includes a UI generation component that facilitates the development of the UI in which control types will be employed and bound to data of a data source. In communication with the generation component is a conversion component that facilitates changing the default control choice immediately after creation, or for evaluating the UI, and later choosing to change the UI control choice. The conversion component employs a service to inspect all controls on a particular form in the designer, and advertises a "Change To" or similar smart tag item for that control, if the control supports data binding and conversions. Selection of the control type or control group view creates the UI of the user's choice, and intelligently maps all control properties and data bindings across the conversion.

30 Claims, 19 Drawing Sheets

ARCHITECTURE FOR CONVERTING CONTROL TYPES IN A DATA BOUND USER INTERFACE

TECHNICAL FIELD

This invention is related to software development tools, and more specifically, a tool for generating a user interface.

BACKGROUND OF THE INVENTION

Software vendors are continually advancing the latest in development tools for users to take advantage of software being pushed to consumers. Typically, such tools require some level of familiarity by the developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

In such development environments, the developer may wish to change the default control choice immediately after creation, or wish to evaluate the UI and later choose to change the UI choice. The manipulation and execution of controls on the interface during the development phase, and even thereafter, where it is desired that a control be changed or modified, can be a labor-intensive prospect.

What is needed is a UI development framework that facilitates at least an improved control customization feature.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a mechanism for converting control types in a user interface (UI) development framework. In a UI development environment where controls can be data bound, the default UI controls can be created, associated properties initialized, and data bindings set. The developer can change the default control choice immediately after creation, or wish to evaluate the UI and later choose to change the UI choice. This is facilitated by a conversion, or "Change To" feature (or similar representative option or command) that enables the user to change a control that was already created at design time to another control. Moreover, all compatible control states are mapped, including data bindings, across the conversion.

In operation, a service inspects all controls on a particular form in the designer, and advertises a "Change To" smart tag item for that control, if the control supports data binding and conversions. The "Change To" smart tag shows a set of control types or control group views that are supported for control conversion and data binding. Clicking on the control type or control group view creates the UI of the user's choice, and intelligently maps all control properties and data bindings across the conversion. In cases where the object is a group of controls, the set of data bound fields or columns are detected, and these bindings are preserved in the conversion.

In another aspect of the present invention, the conversion feature enables the user to change between a bound grid view of the data and a set of bound details controls (e.g., a series of simple bound controls and descriptive labels).

In another aspect thereof, the conversion feature enables the developer to change a group of related controls. For example, the group of related controls can be changed from the bound grid view of the data to a set of bound details controls.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
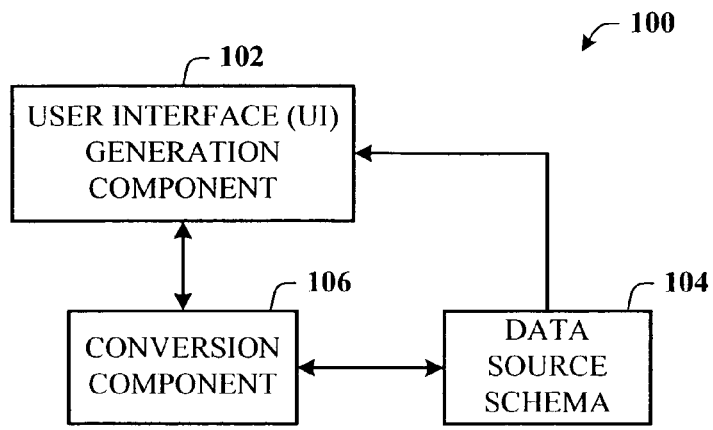
FIG. 1 illustrates a system of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a system 100 of the present invention. The system 100 includes a user interface (UI) generation component 102 that facilitates the development of the UI in which control types will be employed and bound to data of a data source 104. Default UI control types can be created, the associated properties initialized, and data bindings set. In communication with the generation component 102 is a conversion component 106 that facilitates changing the default control choice immediately after creation, or for evaluating the UI and later choosing to change the UI control choice. The conversion component 106 employs a "Change To" feature (or similar representative option or command) that enables the user to change a control (that was already created at design time) to another control. Moreover, all compatible control states are mapped, including data bindings, across the conversion.

More specifically, the conversion component 106 utilizes a service that inspects all controls on a particular form in a designer of the generation component 102. For any suitable control, the service advertises a "Change To" in the form of a smart tag item for that control, if the control supports data binding and conversions. A smart tag identifies a control type with a feature called a smart task. A smart task is a tool whereby the development framework provides an easy and discoverable path to do a next logical task, without blocking the view associated with the developer's current thought process. Such next logical set of tasks include, for example, parameterization, an add and link-to details form, and changing default UI controls from form text boxes to tables.

The "Change To" smart tag enables a pop-up menu showing a set of control types or control group views that are supported for control conversion and data binding. Selecting a control type or control group view creates the UI of the user's choice, and intelligently maps all control properties and data bindings across the conversion. In cases where the object is a group of controls, the set of data bound fields or columns are detected, and these bindings are preserved in the conversion.

The conversion component 106 also enables the user to change between a bound grid view of the data and a bound details view. Where an object is a set of related controls, the conversion feature enables the developer to change the group of related controls from the bound grid view of the data to a set of bound details controls, and back. Note that the conversion component 106 can be part of the UI generation component 102.

The capability to work with control types in accordance with the development aspects of the present invention are important to the iterative development process and opportunistic design of data aware applications. Moreover, such a capability provides a powerful mechanism to transform the UI representation of a data field or set of related data fields with minimal steps and impact on the working application. A UI can be developed and tested more expeditiously facilitating the viewing of the data from many different perspectives according to different UI designs. Additionally, third party controls and/or control groups can be employed and tested more easily.

Figure 2:
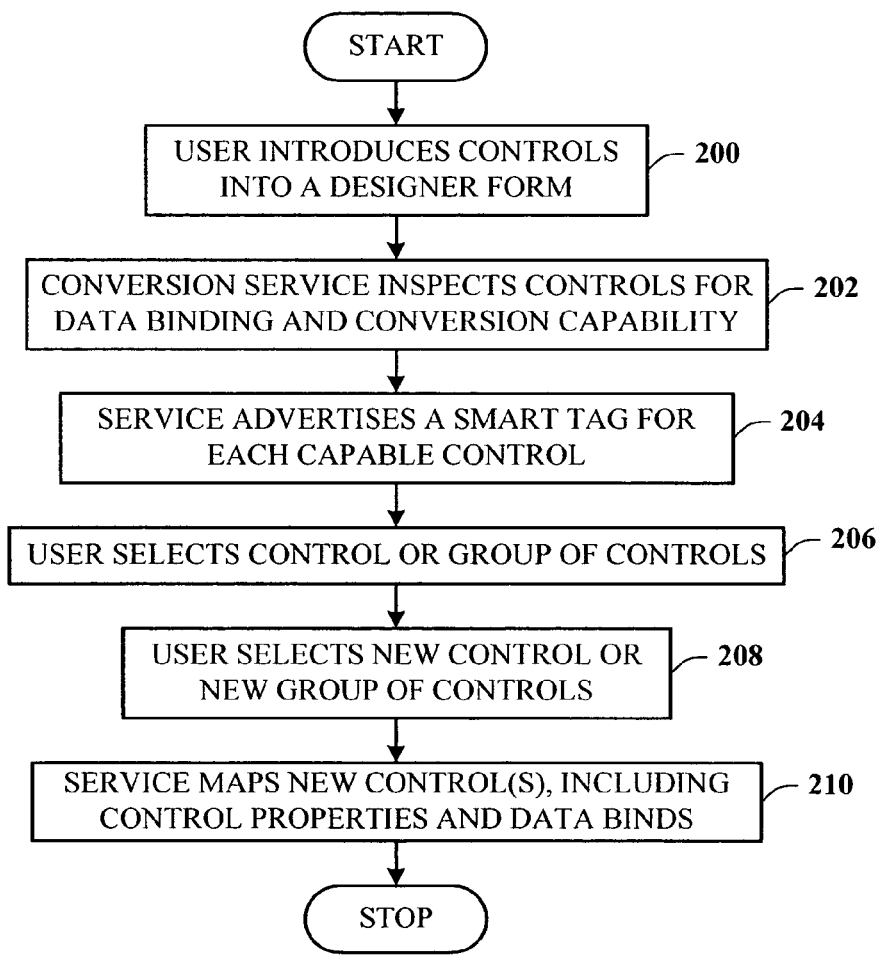
FIG. 2 illustrates a flow chart of a process of control type conversion in accordance with the present invention.

Referring now to FIG. 2, there is illustrated a flow chart of a process of control type conversion in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, the user introduces one or more controls into a designer form within the UI development tool environment. At 202, the tool employs a conversion service that inspects each of the controls for data binding and conversion capability. At 204, the service then advertises a smart tag (e.g., "Change To") for each of the compatible controls. At 206, the user selects an existing control or group of control for change. At 208, the user can then use a mouse pointer to access a smart task menu associated with each smart tag of the corresponding controls to select a new control or group of controls corresponding to the existing control or group of controls selected. At 210, the service converts the new control or group of controls including the associated properties and data binds, and automatically binds the new control(s) to the data source. The process then reaches a Stop block.

Figure 3:
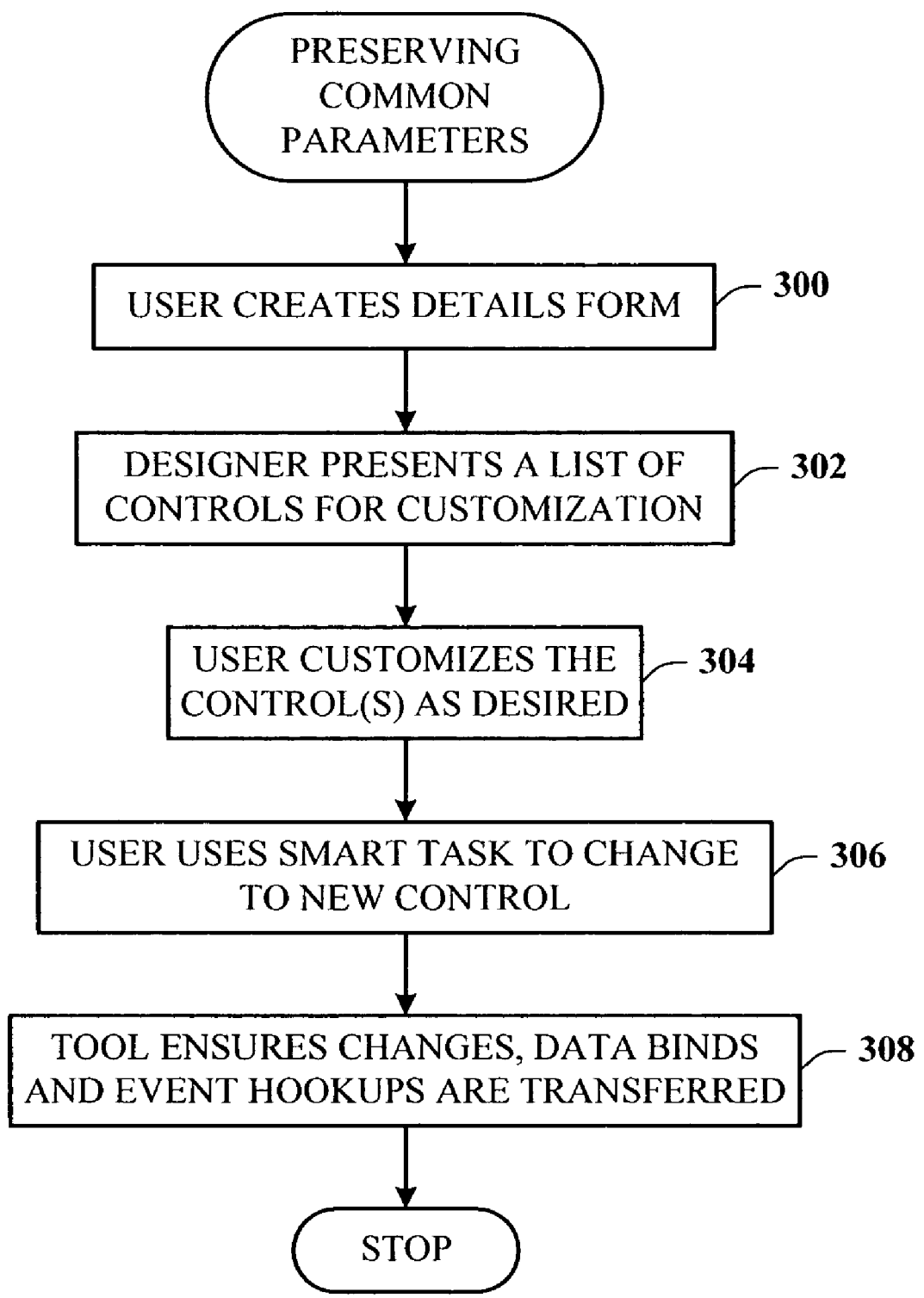
FIG. 3 illustrates a flowchart for of a process for preserving common parameters in accordance with the present invention.

Referring now to FIG. 3, there is illustrated a flowchart of a process preserving common parameters in accordance with the present invention. At 300, the user creates a details form user the designer. At 302, the designer presents a list of controls for customization. At 304, the user customizes the control(s) as desired. At 306, the developer uses a smart task (e.g., a "Convert To" option) to open a menu and convert the existing control to the new control. As further indicated herein, the user can also select a group of the controls for conversion in a group conversion process to a single type of new control. At 308, the designer tool ensures that changes, data binds, and event hookups are transferred to the new control(s). The process then reaches a Stop block.

Figure 4:
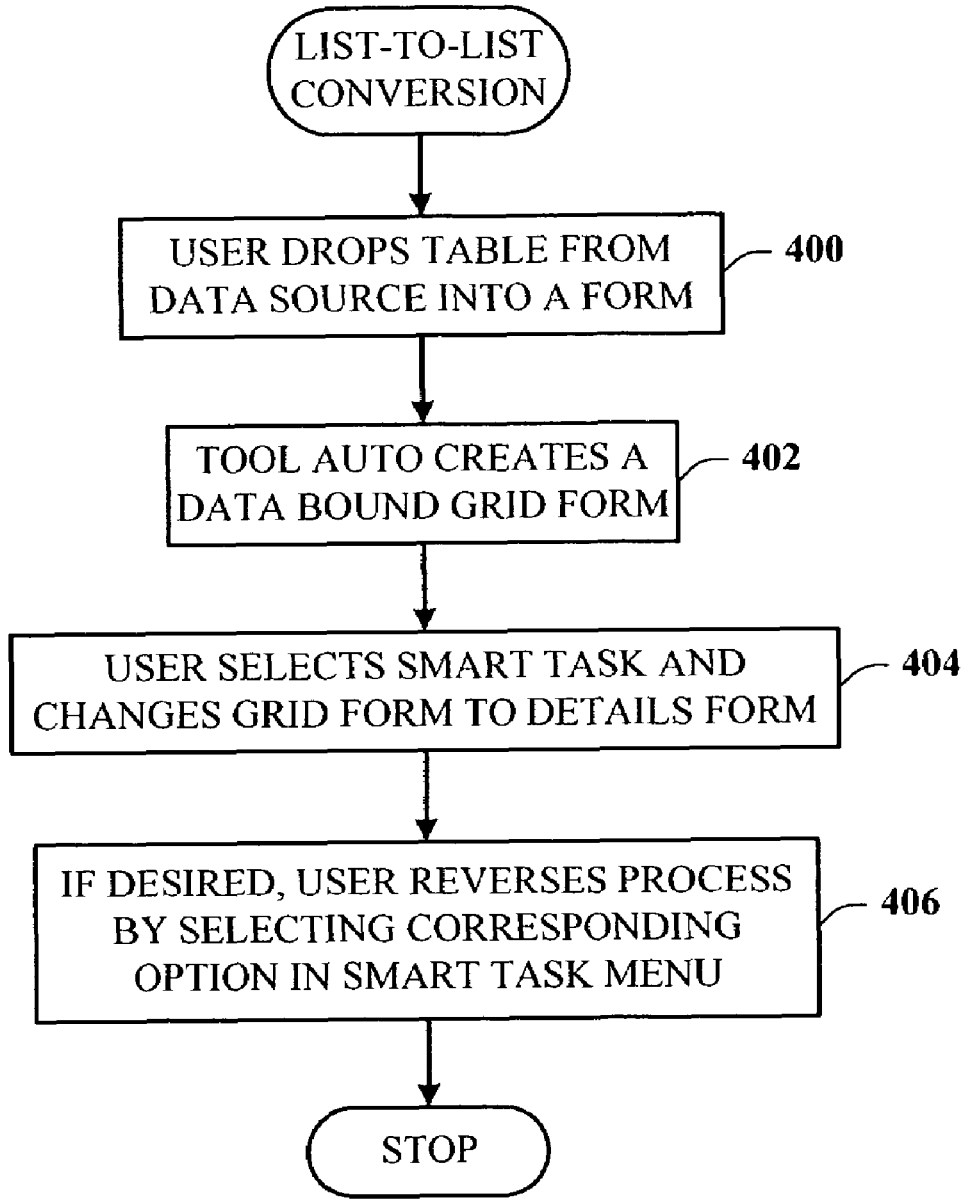
FIG. 4 illustrates a flow chart of a list-to-list conversion process in accordance with the present invention.

Referring now to FIG. 4, there is illustrated a flow chart of a list-to-list conversion process in accordance with the present invention. At 400, the user drags and drops a table (or other data source entity) from a data source into a blank form. At 402, the designer tool automatically creates a data bound grid form. At 404, the user interacts with the associated smart tag of the control, and causes the smart task menu to appear in order to further select a conversion option (e.g., a "Convert To" option) from the smart task list. This changes the grid form to a details form. At 406, the user can reverse the form style from details to grid by again selecting the corresponding option in the smart task menu. The process then reaches a Stop block.

One aspect of data development is to ensure that simple developer tasks are made easy to perform in the tool and always produce a working application. Following is a brief description of smart tasks/tags in relation to the conversion capabilities of the present invention.

A smart task is a smart tag that the user sees on the design surface, which contains a set of commands each that help execute a logical and oftentimes complex developer task. There are two mainline types of smart tasks used in the development environment: an always-present smart task, and an action-modifying smart task. The always-present smart tasks (also called an object tag) is a set of task-based commands exposed in a smart tag that are associated with a particular control and the common tasks that can always be performed, knowing the type of the control and the state it is in. Data Form control smart tasks are exposed for any control bound to a data source. The action-modifying smart task (also called event tags) is a temporary smart tag that exposes commands that alter the action with a user specified result (assuming that an action was performed with a default). This type of smart tag provides value in the context of an action, and not a control selection. Thus, users can expect this smart tag to expire after any session-dirtying action is performed. Additionally, there is a greater sense of urgency to react to this type of smart tag, as it is likely to expire before trying other actions. Object tags can intersect with event tags exposed by other features.

Selecting the "paste smart tag" option allows the user to change the selected result from a data bound series of form controls to a data bound grid control. Additionally, site selecting an individual control and picking the control is supported. This is a valuable feature for users who do not want the default drop result. The user also sees options on the smart tag to choose the default and set preferences about future smart tags.

The "Change To" smart task allows the user to change the existing control to any other control that supports data binding to this data field type. The most common property values and events are copied over seamlessly. This smart tag can also be configured to never expire or disappear, which allows the user to make common changes to the form (e.g., move the controls, resize, anchor, dock, alter appearance, and set the name, to name a few) without losing the capability to change the UI control.

Data Smart Task—Convert UI

The development tool drag-and-drop features provide a very rapid mechanism to generate data bound UI from the name and type data source table and/or field. To avoid any loss of productivity or interrupts in developer thought processes, the drag-and-drop experience, in general, facilitates dropping a default control or set of controls without prompting or popping up a model dialog. What this means, however, is that a developer needs an easy way to customize the result of the drop if he or she does not like the default.

The convert UI smart task is one feature that enables the developer to change the resulting control to another supported data bound control. This feature adds the most value after an initial drop by staying available longer after the drop. This enables the developer to iterate on the design of the details form without having to consider the sequence or time in which tasks are performed. Another feature is a drop-down menu in drag source itself that allows the user to pick the control result before the drop. Following are a number of common scenarios, although not an exhaustive list of scenarios that would be encountered using the novel aspect of the present invention.

A first scenario relates to the conversion to a new control from an existing control after the drop. The developer drags and drops a field related to, e.g., State, from the data source to the form. A "State" label and a simple bound TextBox control is then automatically added to the form. When the user clicks on the smart tag corresponding to the selected text box, a Convert To command can be selected in response to which the same list of controls is presented that can be bound to that underlying data source field type. If "ComboBox" is selected, the tool automatically changes the UI to a ComboBox control, saving time and additional effort traditionally required to create a new UI for this field. This is quicker than using a drag and drop feature.

A second scenario involves preserving common properties and events during the conversion process. The developer creates a details form using the drag-and-drop feature. A list of controls in the designer can then be quickly perused to customize properties, such as name, font, size, and anchoring. Once the textbox control corresponding to the State field has been evaluated, the user decides that an editable combobox would work better for this form. Accordingly, the user simply uses the Convert To smart task to change the control to a combobox. The corresponding property changes, data bindings, and event hookups (that the controls shared in common) are preserved.

A third scenario considers a list-to-list conversion after the drop. The developer drags and drops a table from the data source to the form, in response to which the development tool automatically creates a data bound grid. However, the user really wanted a details form. The Convert To smart task allows the user to change the grid form to a details form.

The user model for the Convert To smart tag is the same as the "object-tag" style smart tag. In short, the user selects a data form control, in response to which a smart tag with a Convert To command is exposed. The availability of this smart tag does not expire The following is a table of at least some of the conversions that are supported. A conversion to a particular control is supported if the underlying data source field supports generating a control for that type.

| DataSource Object | Windows Form Control |
|---|---|
| String column | Textbox (if maxlength >30, set multiline = true), Label, MaskedEdit, LinkLabel, ComboBox, ListBox |
| DateTime column | DateTimePicker, Textbox, Label, MaskedEdit, LinkLabel, ComboBox, ListBox |
| Boolean column | Checkbox, Radio Button, Dropdown List, Textbox, Label, MaskedEdit, LinkLabel, ComboBox, ListBox |
| Int64, Int32, Int16 column | Text box, Label, MaskedEdit, LinkLabel, ComboBox, ListBox, NumericUpDown (spinner) |
| Decimal column | Text box, Label, MaskedEdit, LinkLabel, ComboBox, ListBox |

-continued

| DataSource Object | Windows Form Control |
|---|---|
| Single, Double column | Text box, Label, MaskedEdit, LinkLabel, ComboBox, ListBox |
| Byte[ ] column | "Object" Label with Tag, PictureBox |
| Object column | "Object" Label with Tag, PictureBox |
| Guid column | Text box, Label, MaskedEdit, LinkLabel, ComboBox, ListBox |
| DataGridView (list of fields) | Details controls (list of fields) |

A third party control feature can be added to the drag-drop end-to-end scenario, in response to which the list above also enumerates the list of supported third party controls. This can be a data driven list of controls that adhere to a strict standard defined by the development environment.

The development tool includes a set of default bound properties for the interface for binding data sources to simple, complex, and lookup style controls using an interface and attributes. Note, however, that more generic support can be provided by allowing, for example, user-provided conversions. Additionally, on other platforms, the converter could work differently based on how the controls are architectured. Drag-and-drop and control conversion features fully leverage this information to understand how to bind to new and existing controls, and also how to set additional information such as the default bound property. For example, a TextBox control is marked with an attribute describing itself as a simple-bound control. Additionally, it marks the Text property as the default bound property. This information is used to bind a field such as Customers.CustomerId to the TextBox.Text property.

Control conversion can be at least simple and complex, according to whether the control is simple or complex. A complex control differs from a simple control in that it binds to the schema provided by one or more data source fields, and in many cases, allows the user to bind to a list of one or more items.

Simple control conversion requires the designer to create a new control of the desired type, compare and copy all common properties, bindings, formatting, event hookups, and any special case mappings, before removing the previous control. This avoids significant application breakage and data loss. Control conversion may also be applied to a complex control or list control. For example, a DataGridView control may be changed to a series of simple bound details controls and labels, all bound to a common DataManager or DataContainer.

Complex control conversion is very similar to simple control conversion. The designer inspects which data source the complex control is bound to, creates a new complex control or control group based on the data source schema, and copies common properties and the data source reference across the conversion.

When converting from DataGridView to "Details Form", the designer will detect all DataGridView controls that are bound to a data source, and will expose a Change To Details Form smart tag item, if true. When selected, the designer inspects which schema fields (i.e., subset, all, or none) are being displayed by the data grid view. A new region will then be created to display details controls. For each schema field being displayed, a new pair of field labels and simple bound field controls will be created. The label displays the friendly field name from the data source. The simple control type is obtained from the user's custom control choice for that schema field, its default simple bound property is bound to that data source field, and its name is chosen using the default naming conventions. For example, an "Id" column displayed in a DataGridView will be converted to a new label, with text set to the name of the field ("Id"), and a new TextBox control that has its default Text property binding set to the "Id" column. Once the details form is created, the previous DataGridView is cleared.

When converting from "Details Form" to DataGridView, it is also possible to do the conversion in the reverse direction. The designer first detects what the common data source and data fields are to convert its respective bound details controls. The data source is detected by either inspecting the bound data source for a container control, or any particular details control inside the container. The fields are detected by inspecting all fields that are bound to or consumed for that common data source inside the container. Once the data source and fields are detected, a new DataGridView is created, bound to the common data source, and has its display columns set to show the subset of interesting fields. The former container with details form controls is cleared.

Where common properties are involved, the existing control(s) and new control(s) are compared property by property for values with the same name and type. If the name and type of a property match, the value is copied to the new control. If the old control contains a property that is not contained in the new control, the value is lost. If the new control contains a property that is contained in the old control, the new control will continue to use the default-initialized value. Property values that are preserved include, but are not limited to, name, bindings collection, formatting, appearance, location, size, and anchoring/docking.

Where special properties conversions are involved, both default bound properties and lookup style data binding are considered. The one or more default bound properties of the new control are set to the data source field. For example, consider that the old control is a TextBox that has TextBox.Text bound to HRWeb.Employees.IsActive (bool). The new control is a CheckBox, which will have its default properties CheckBox.Checked bound to HRWeb.Employees.IsActive.

Lookup style data bindings include DataSource, ValueMember, and DisplayMember. If the old and new controls are both lookup style controls, then the DataSource, ValueMember, DisplayMember, and SelectedValue properties are copied. If only the new control is lookup style, then DataSource, ValueMember, DisplayMember, and the default bound property are all bound to the data source field. The user may then use the configure lookup data source smart tag to customize the lookup binding. Note that this is but one example of the way in which lookup controls work. Other platforms can have different ways to bind controls.

Where event hookups (e.g., Method Handles OldControl.FooEvent, OldControl.FooEvent+=new FooEventHandler (MethodDelegate) have been written against the control, at least two improvements can be employed to address a change in UI control type (i.e., as the hookup is removed, the code inside breaks). In one implementation, the tool notifies the user of the missing hookup. For example, the designer can be employed to output a TODO comment above the affected handler.

In a second implementation, the event hookups are compared and copied between the old and new controls, which occurs similarly for the properties. If the old and new controls contain event hookups of matching event name and type, each event handler hookup is wired to the new control, and the hookup to the old control is removed. If the old control includes an event hookup that the new control does not, the event handler is preserved, but the event hookup is removed.

Note that the property and event hookup copying features will fix simple cases, especially where old and new UI types are very similar in type (e.g., one lookup style control maps over well to another).

Undo support rolls back the removal/change of the control and its event hookup, and facilitates bringing development back to stable point, especially in scenarios when the user writes many lines of code and then decides to perform the task, which inadvertently breaks the code.

Other features include validation, paging, lazy loading (e.g., columns, details on demand), filtering and sorting (server side, as well as client side/views), resynchronization to the data source, lookup (make lookup . . . ), error handling, concurrency handling, a login dialog, view data source, and aggregate/computed columns.

Figure 5:
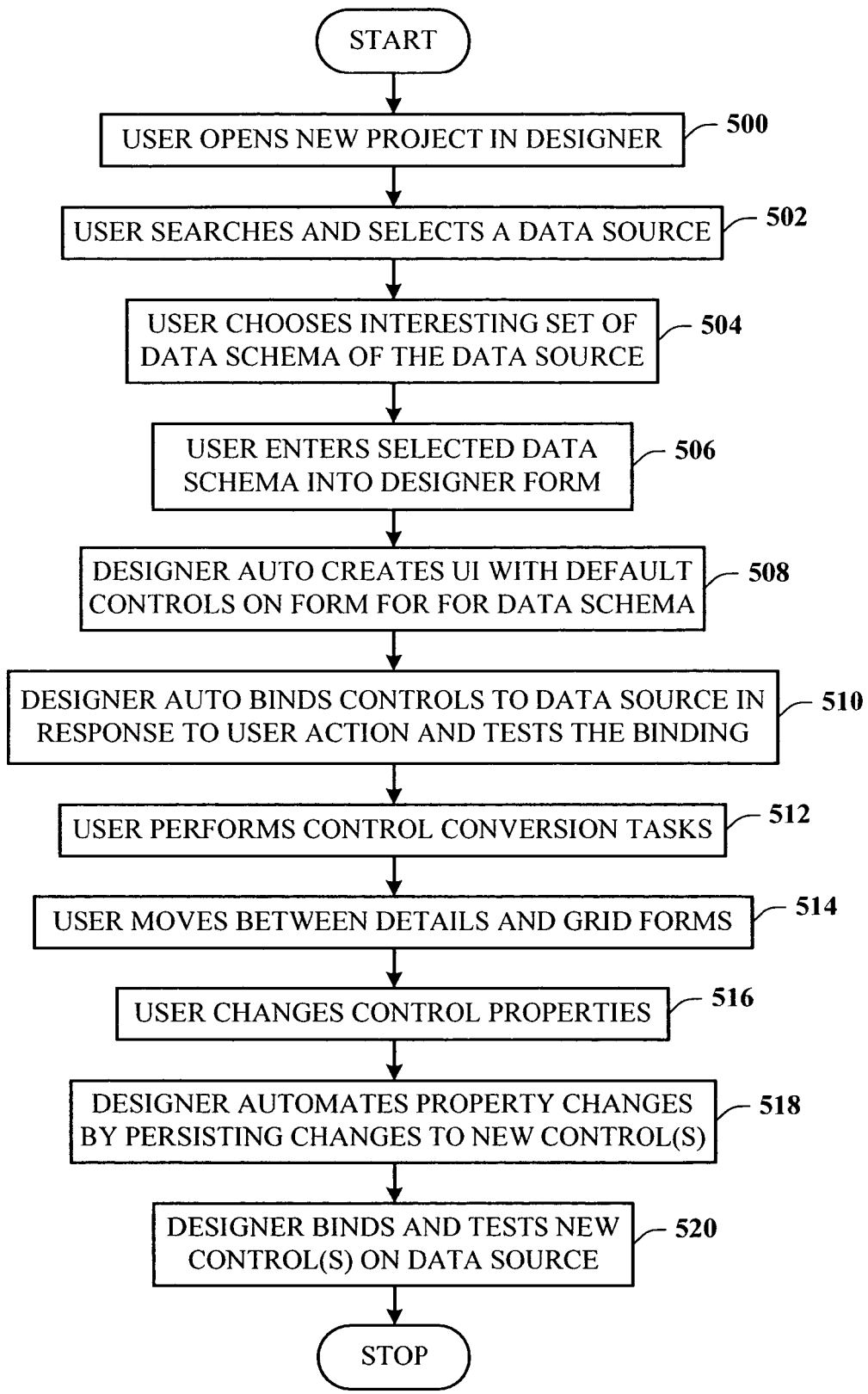
FIG. 5 illustrates a flow chart of a process of control type conversion in accordance with the present invention.

Referring now to FIG. 5, there is illustrated a flow chart of a process of control type conversion in accordance with the present invention. At 500, the user opens a new project in the designer tool. At 502, the user search and selects a data source. The data source can be a database, web service, object (e.g., a business object), or other type of data source. At 504, the user chooses an interesting set of data schema of the data source. At 506, the user enters selected interesting data schema into the designer form. In response, the designer automatically creates a UI with default controls on the form that correspond to the type of data schema, as indicated at 508. At 510, the designer automatically binds the controls to the data source in response to the user action, and tests the bindings. At 512, the user performs control conversion tasks. At 514, the user moves between a details form and a grid form. At 516, the user changes control properties. At 518, the designer automates the property changes by persisting the changes to the new control(s). At 520, the designer binds and tests the new control(s) on the data source. The process then reaches a Stop block.

Following are a series of example screenshots in accordance with the flow chart of FIG. 5.

Figure 6:
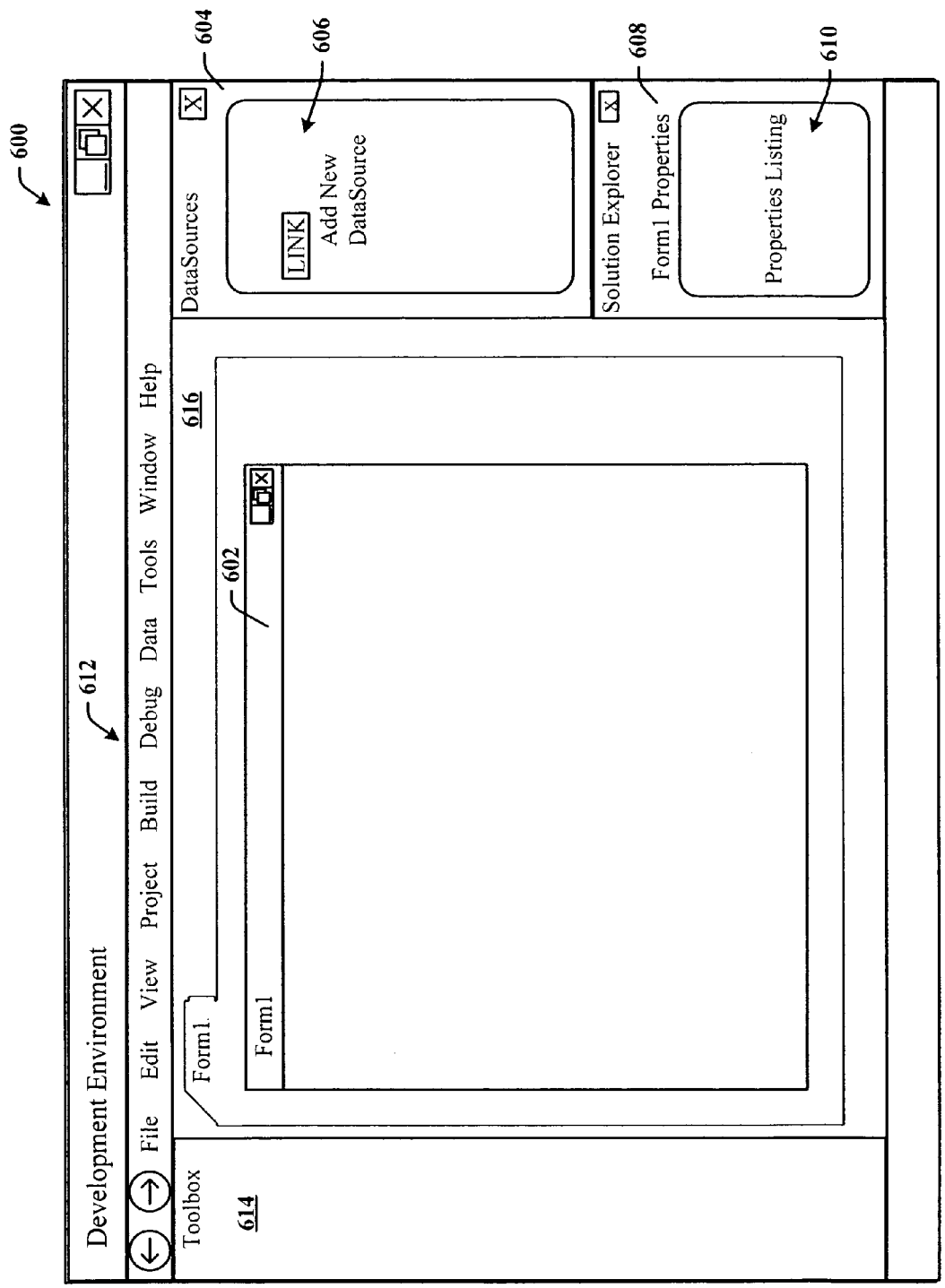
FIG. 6 illustrates a window showing an open design form of a UI development environment for processing controls in accordance with the present invention.

Referring now to FIG. 6, there is illustrated a window 600 showing an open design form 602 of a UI development environment for processing controls in accordance with the present invention. The window 600 includes a data sources explorer window 604 to a side of the form 602 from which to select a data source on which to base the UI. The data sources window 604 includes a link 606 to execute in furtherance of selecting the data source. The window 600 also includes a properties window 608 that presents the properties of the component or control currently selected on the designer including but not limited to AcceptButton, AccessibleDescription, AccessibleName, AccessibleRole, AutoScroll, AutoScale, AutoSize, AutoValidate, and BackColor, for example. This can also be the properties of the form itself. The window 600 also illustrates a number of menu selections 612 for accessing various functions of the development environment, the menu selection including File, Edit, View, Project, Build, Debug, Data, Tools, Window, and Help. A toolbox window 614 is presented to a side of a designer workspace 616 in which the form 602 is presented, which toolbox provides quick and easy access to a large number of tools for building a UI.

Figure 7:
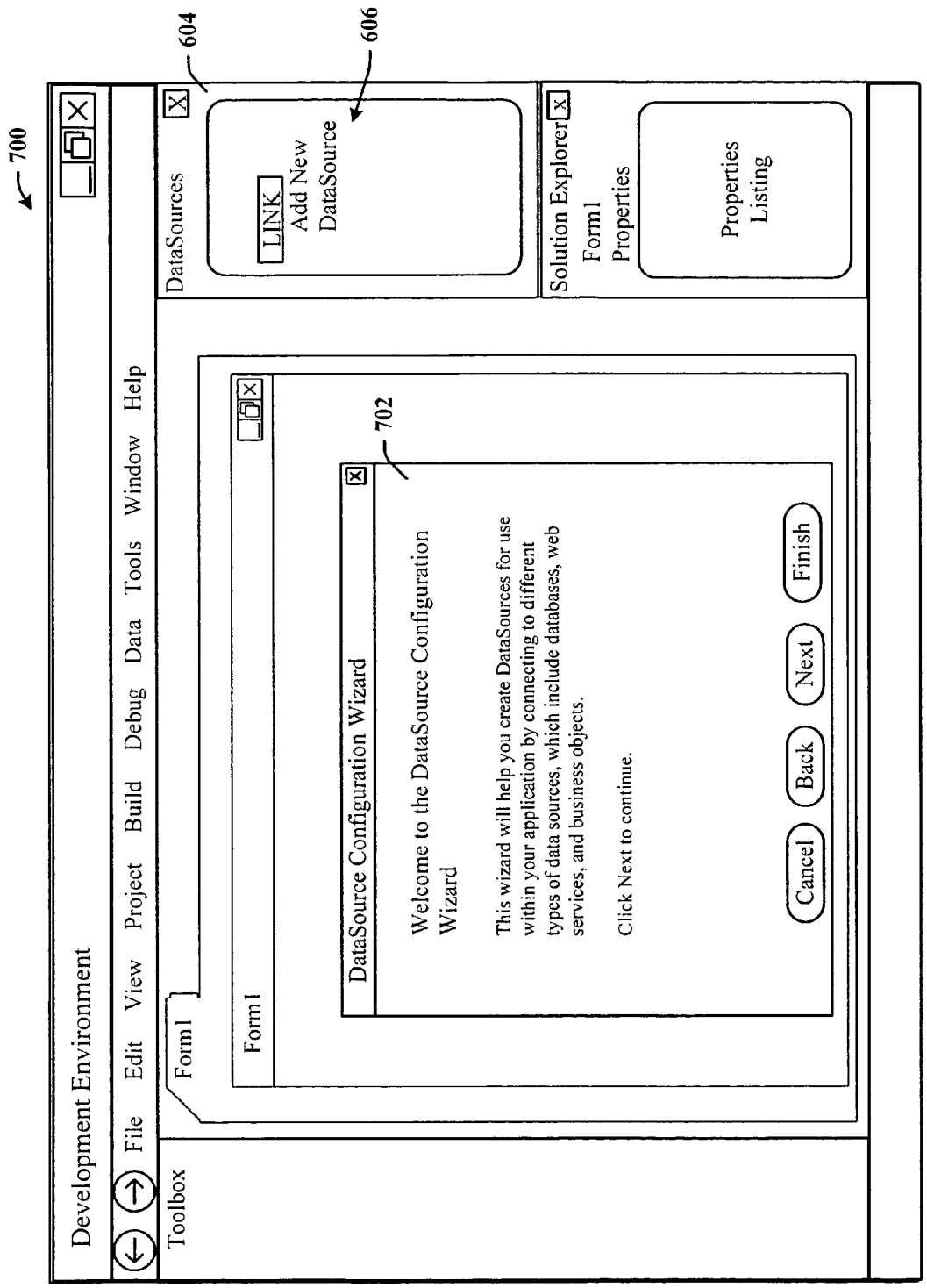
FIG. 7 illustrates a window where a data source wizard is presented to facilitate finding and selecting a data source.

Referring now to FIG. 7, there is illustrated a window 700 where a data source wizard 702 is presented to facilitate finding and selecting a data source. The wizard 702 is presented in response the user selecting the link 606 in the data sources explorer window 604. Since the project has no existing data source, access to the wizard is automatically presented to the user.

Figure 8:
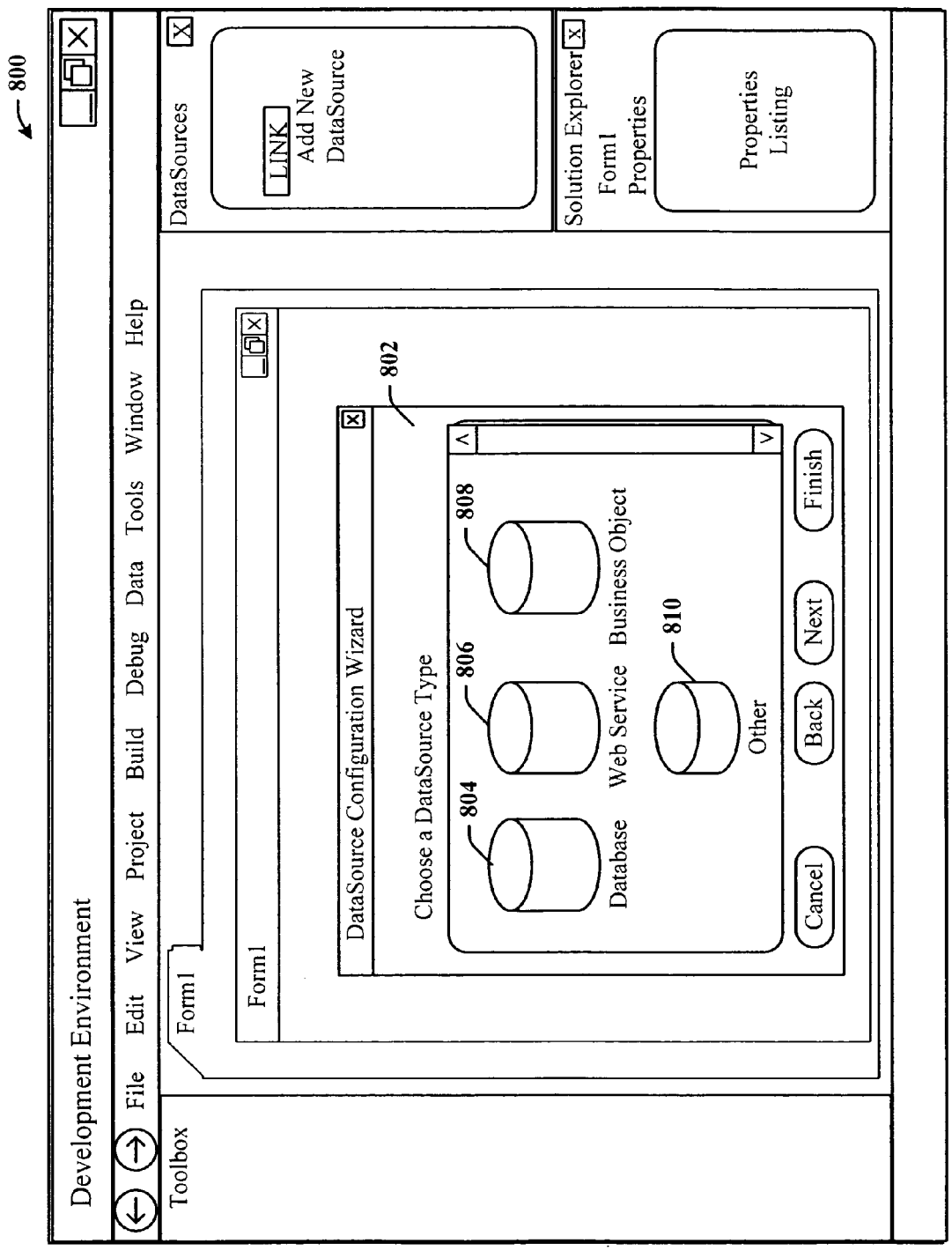
FIG. 8 illustrates a window where a follow-on data source wizard window presents the available data sources to the user for selection.

Referring now to FIG. 8, there is illustrated a window 800 where a follow-on data source wizard window 802 presents the available data sources to the user for selection. Here, the wizard window 802 allows the selection of a database 804, a web service 806, a business object 808, and another data source 810 that is selectable by the user to expose other data sources. The wizard will search and present all suitable data sources, including heterogeneous data sources.

Figure 9:
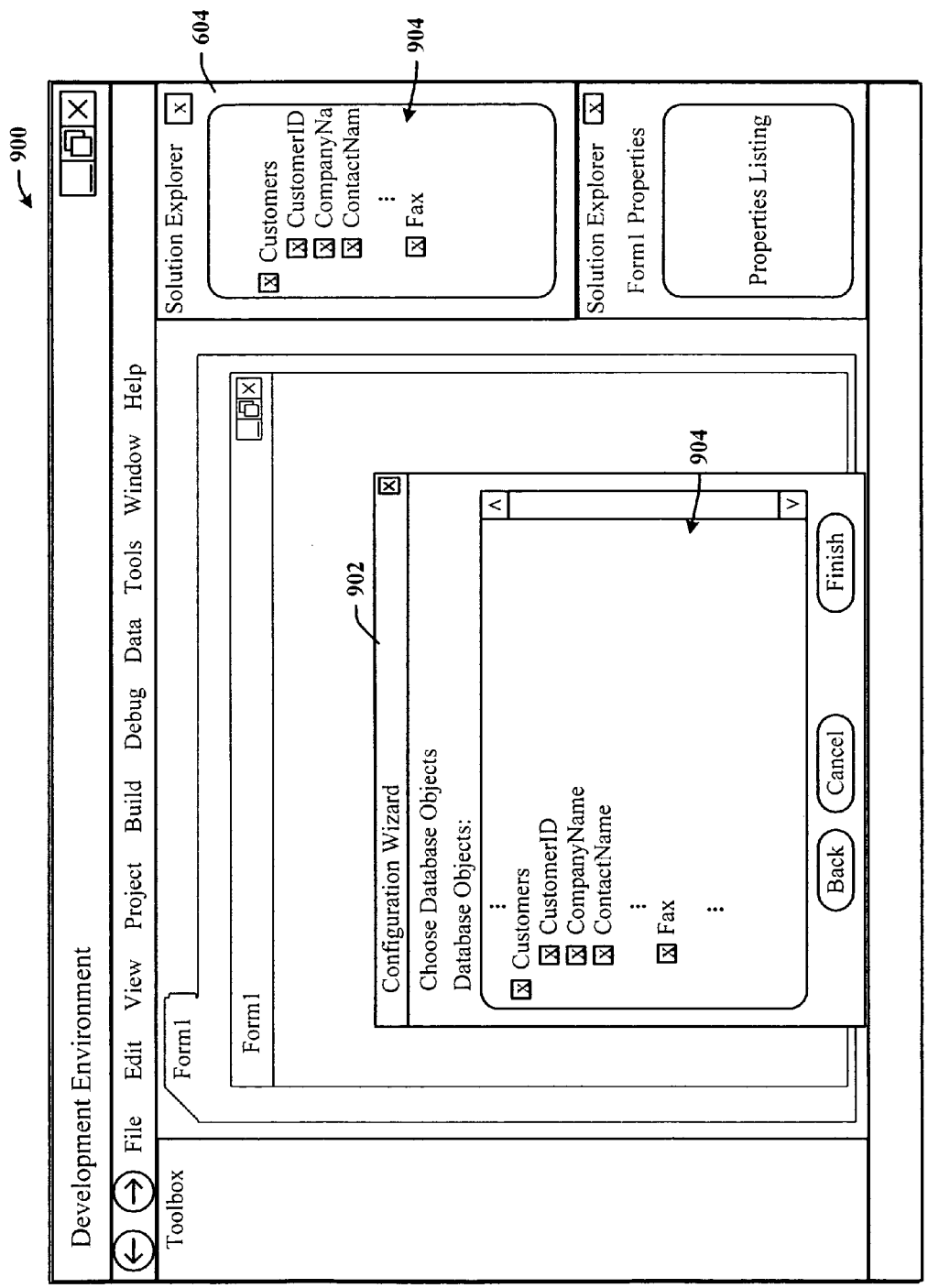
FIG. 9 illustrates a window showing a follow-on data source wizard window presenting a data schema of the selected data source.

Referring now to FIG. 9, there is illustrated a window 900 showing a follow-on data source wizard window 902 presenting a data schema 904 of the selected data source. Once the data schema 904 is presented in the wizard window 902, the user can select all or a subset of the schema objects (tables and fields), and cause the selected schema objects (e.g., under Customers) to be moved and presented in the side explorer window 604 for convenient access during the UI generation process.

Figure 10:
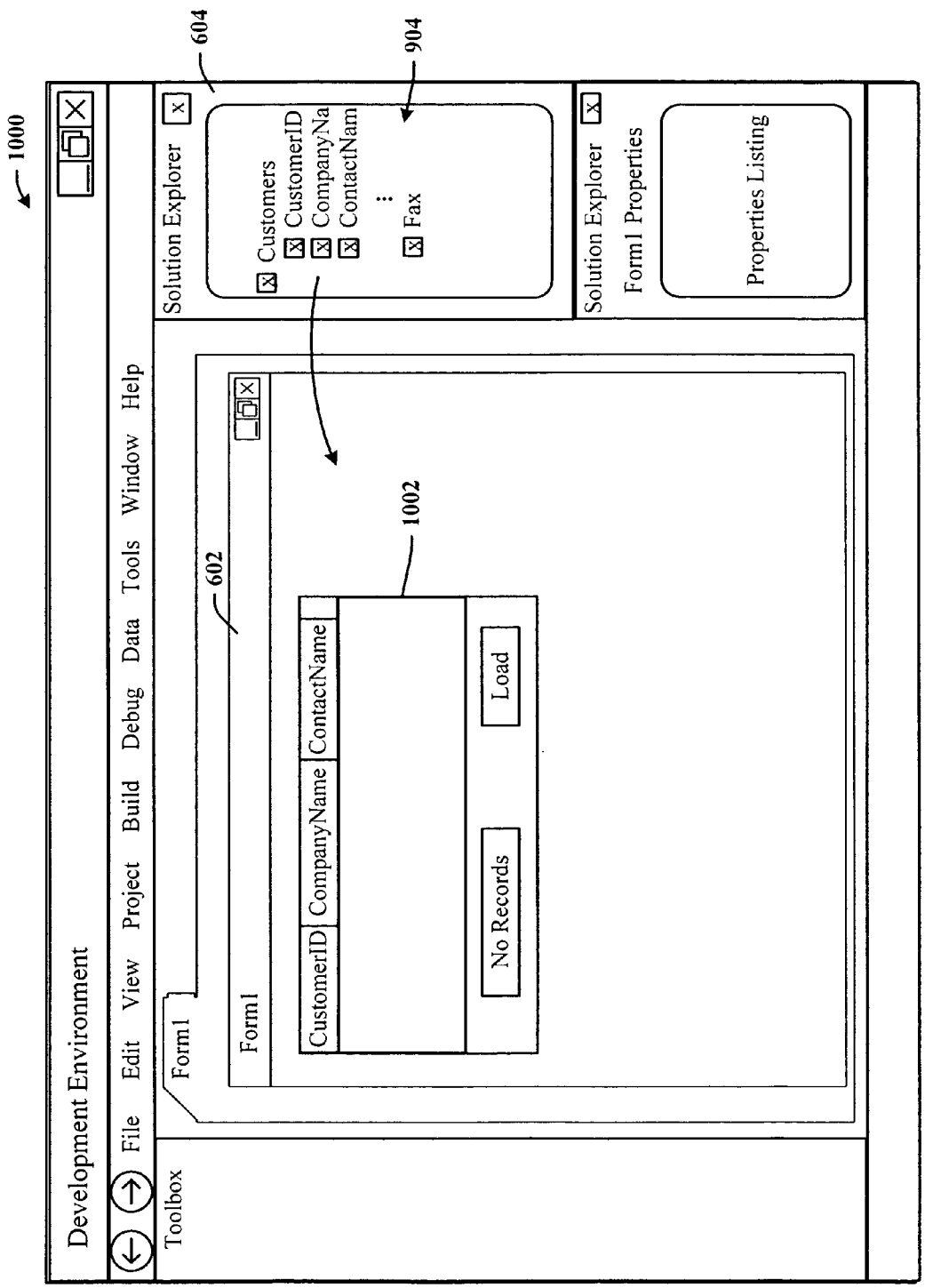
FIG. 10 illustrates a window showing controls that are automatically placed into the form after the user drags and drops selected data schema from the side data source window to the form.

Referring now to FIG. 10, there is illustrated a window 1000 showing controls 1002 that are automatically placed into the form 602 after the user drags and drops selected data schema 904 from the side data source window 604 to the form 602. Another method of placing the controls into the designer form 602 is to download the selected schema into the form 602. The drag-and-drop process produces a working UI screen 1002 with default controls. The designer automatically selects a default control. The default control is configurable using options with the development environment.

Figure 11:
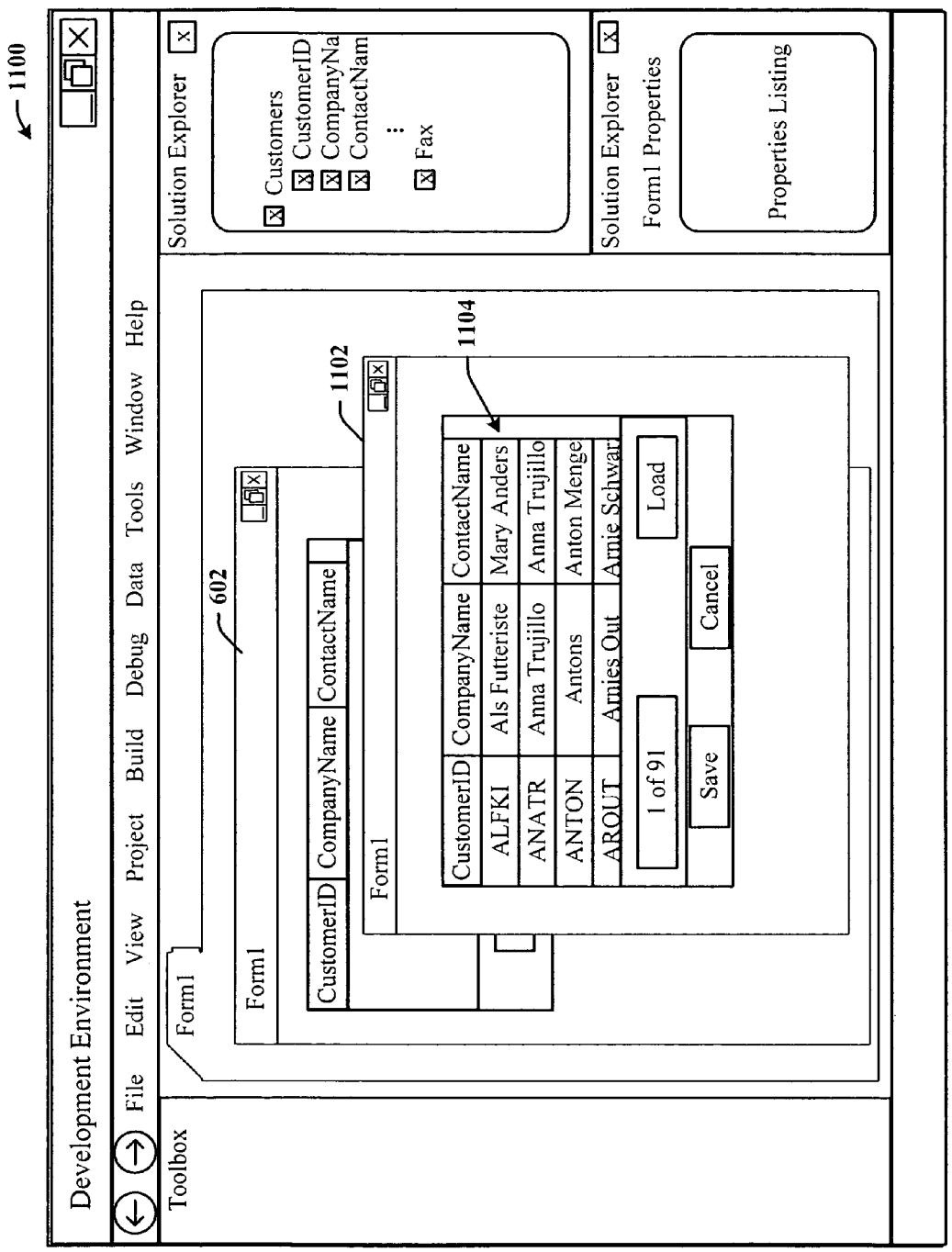
FIG. 11 illustrates a window showing data bound records in a second form that are produced in response to testing the controls against the selected data source.

Referring now to FIG. 11, there is illustrated a window 1100 showing data bound records 1102 in a second form 1104 that are produced in response to testing the controls against the selected data source. This is a probable mapping that can be later applied to complete the UI generation process.

Figure 12:
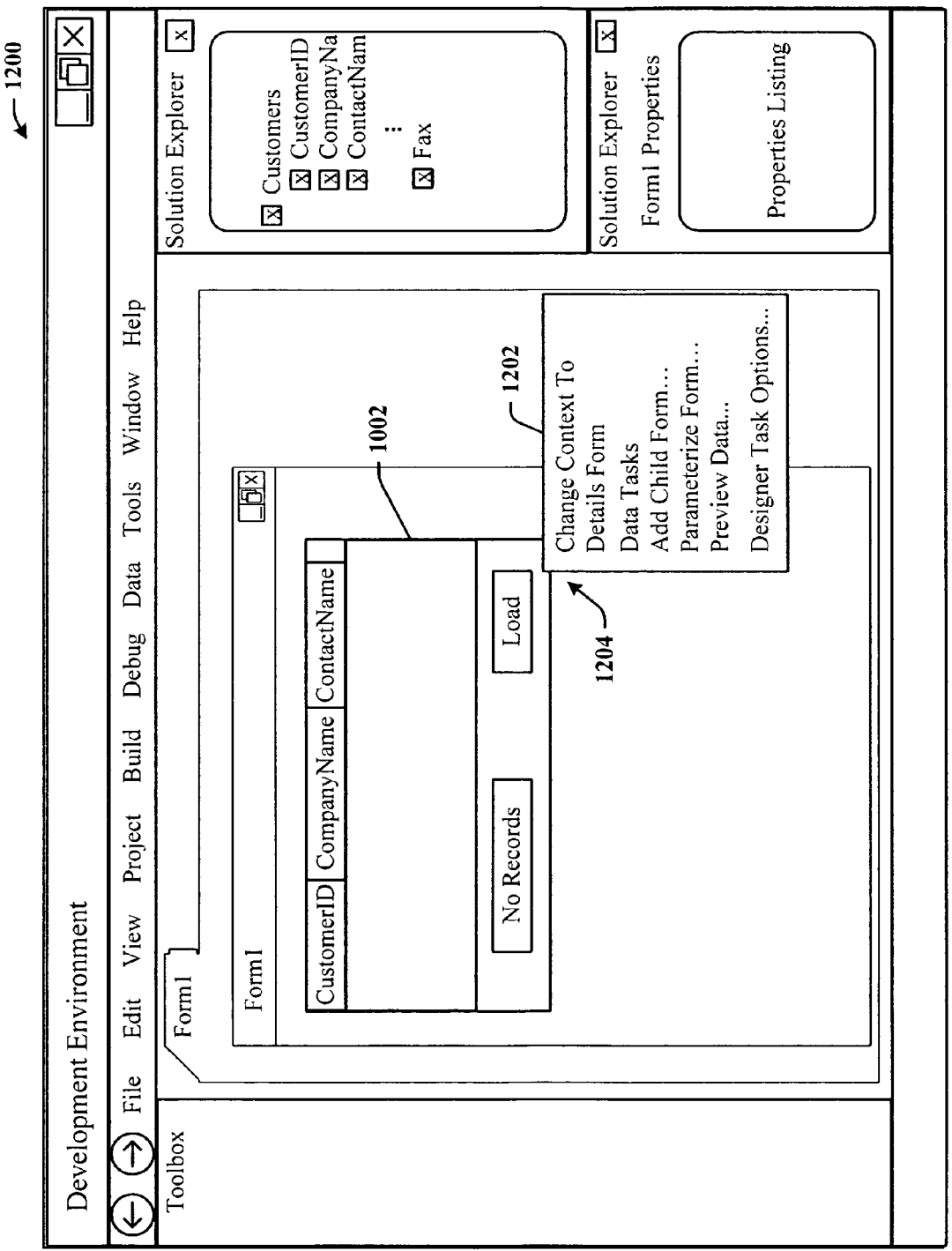
FIG. 12 illustrates a window showing a smart task menu that is activated when the user interacts with a smart tag of the controls.

Referring now to FIG. 12, there is illustrated a window 1200 showing a smart task menu 1202 that is activated when the user interacts with a smart tag of the controls 1002. The user can now access options to facilitate conversion of an existing control (or set of controls) to a new control (or set of new controls). The smart task menu includes (but is not limited to) in this particular implementation, options to change context, switch to a details form, perform data tasks, add a child form, parameterize a form, preview data, and access designer task options. The smart tag is activated by hovering the mouse over a predetermined area 1204 of the controls graphic 1002.

Figure 13:
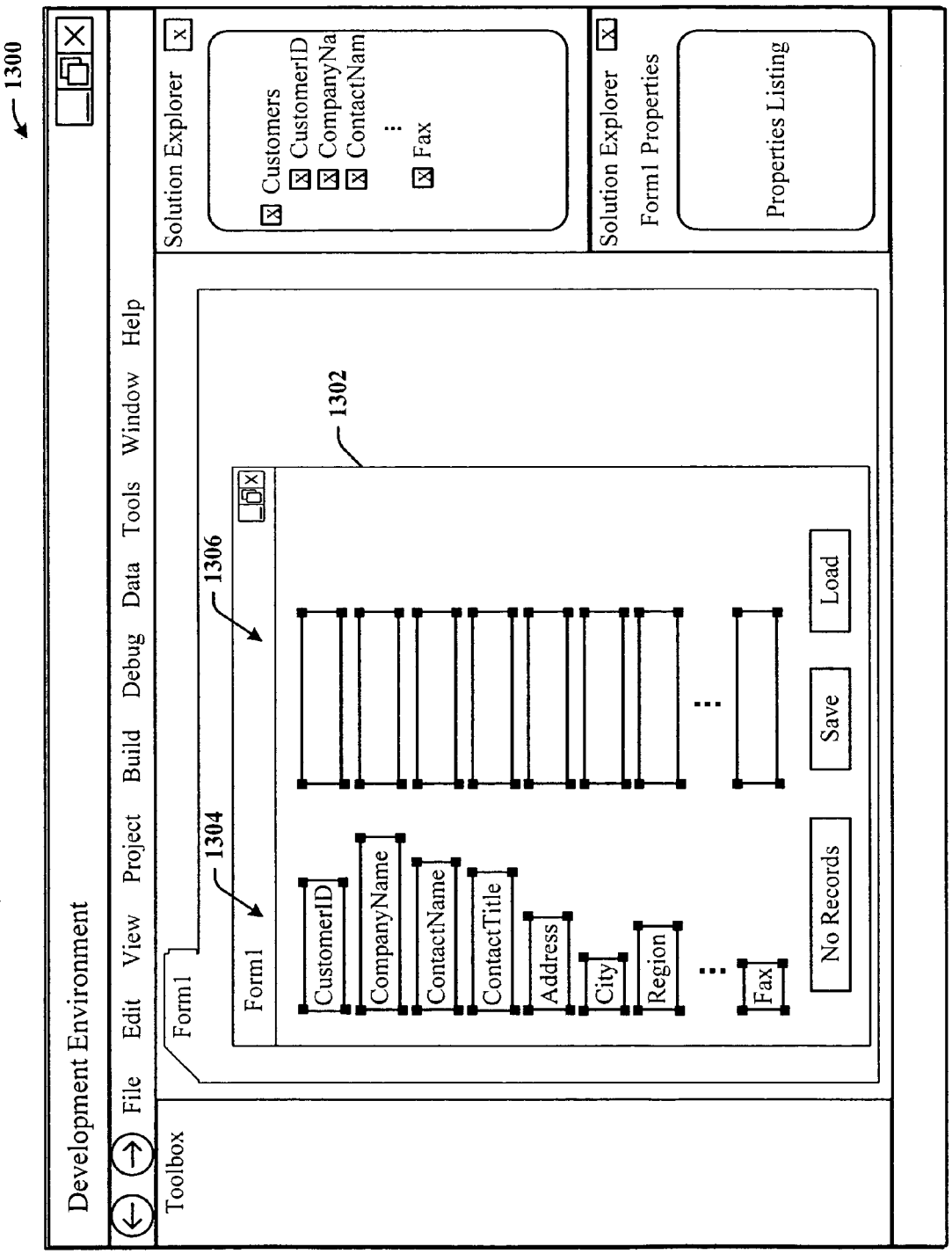
FIG. 13 illustrates a window showing a bound grid form with labels and controls that are properly bound.

Referring now to FIG. 13, there is illustrated a window 1300 showing a bound grid form 1302 with labels 1304 and controls 1306 that are properly bound.

Figure 14:
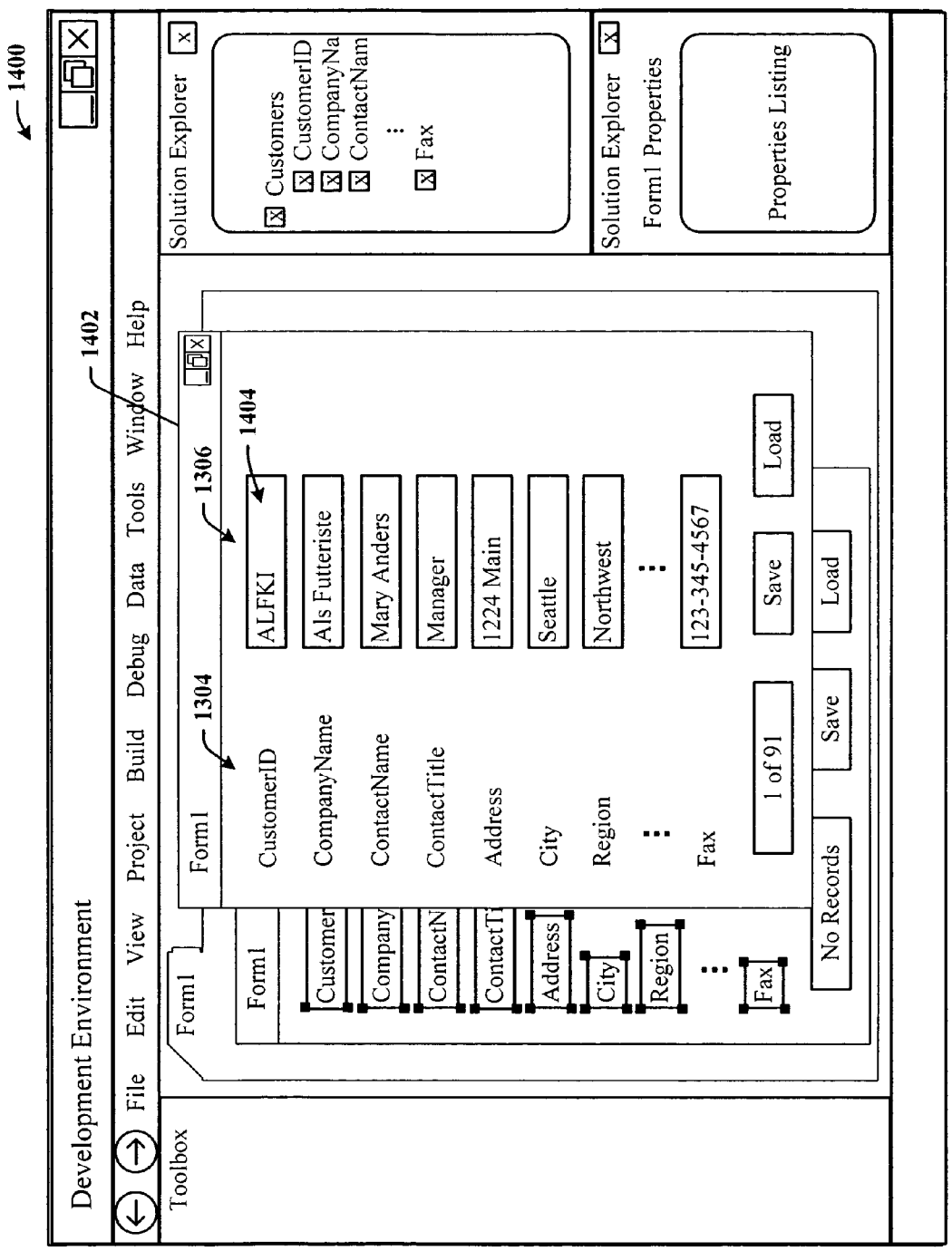
FIG. 14 illustrates a window showing a working details form showing details in the controls and associated labels.

Referring now to FIG. 14, there is illustrated a window 1400 showing a working details form 1402 showing details 1404 in the controls 1306 and associated labels 1304.

Figure 15:
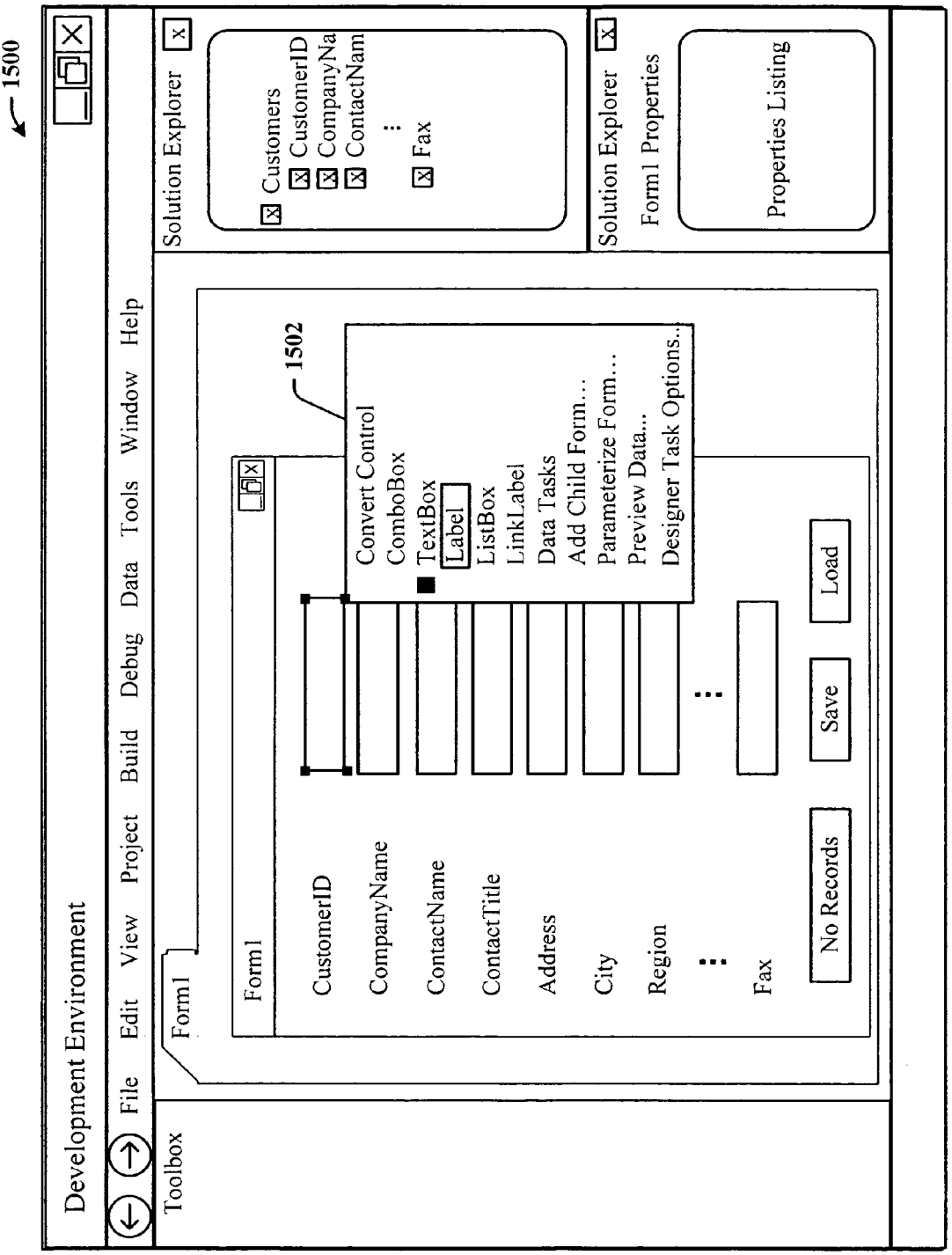
FIG. 15 illustrates a window showing the capability to convert controls to different control types that support this type of binding.

Referring now to FIG. 15, there is illustrated a window 1500 showing the capability to convert controls to different control types that support this type of binding. When the user activates a smart tag associated with a control (e.g., CustomerID) and smart task menu window 1502 opens. The task menu 1502 shows that the current control type is a text box. The user chooses to change it to a label control type by selecting the Label option from the task menu 1502.

Figure 16:
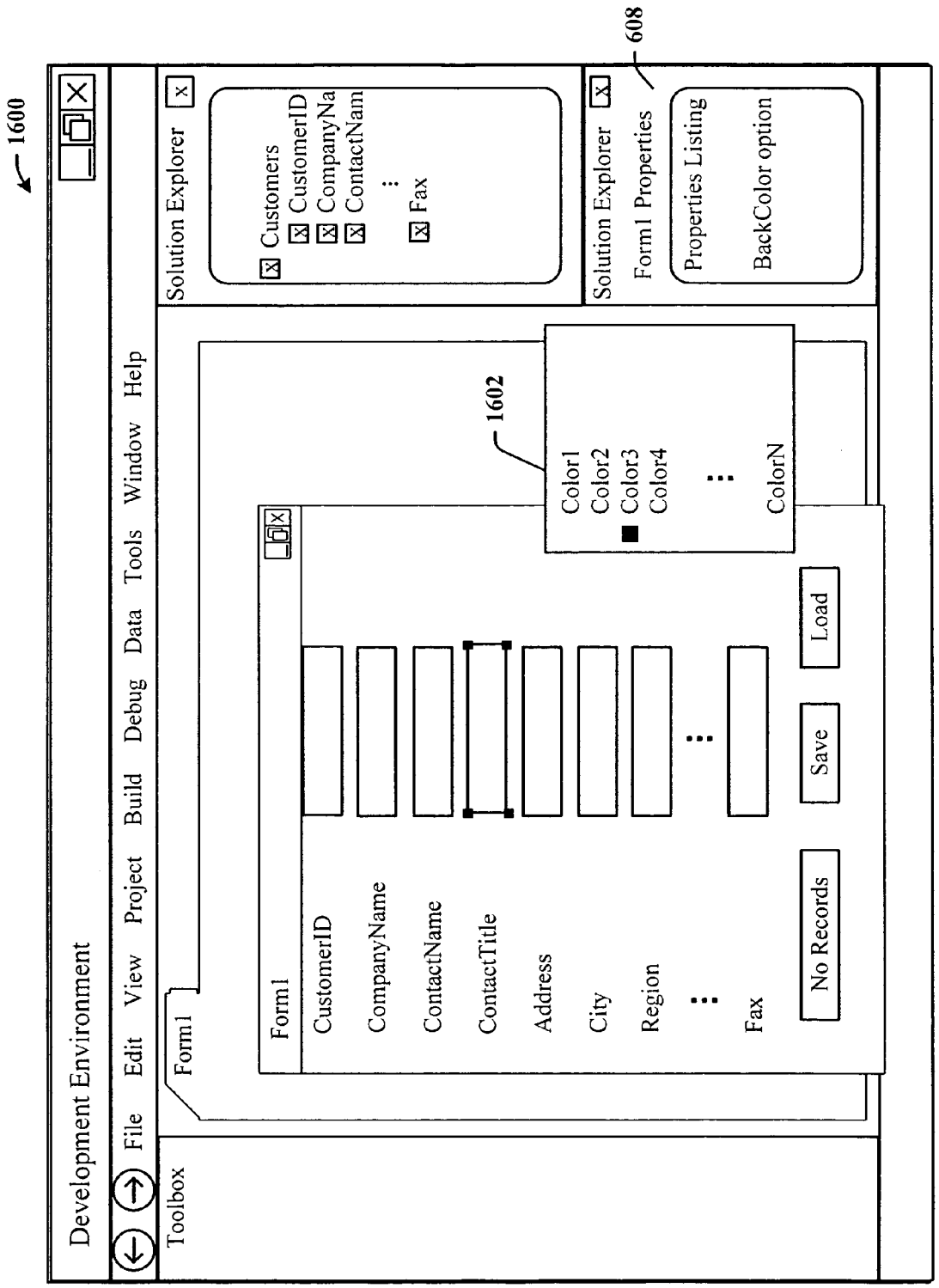
FIG. 16 illustrates a window showing the capability to change properties of a control or group of controls.

Referring now to FIG. 16, there is illustrated a window 1600 showing the capability to change properties of a control or group of controls. Here, the user has selected a control associated with the ContactTitle label, and further selected a back color property option from the Properties window 608, in response to which a color menu 1602 opens. The user can then select a background color for the ContactTitle control. The user can change colors, styles, and other properties over time, the changes of which will be persisted by the designer tool to the associated new controls.

Figure 17:
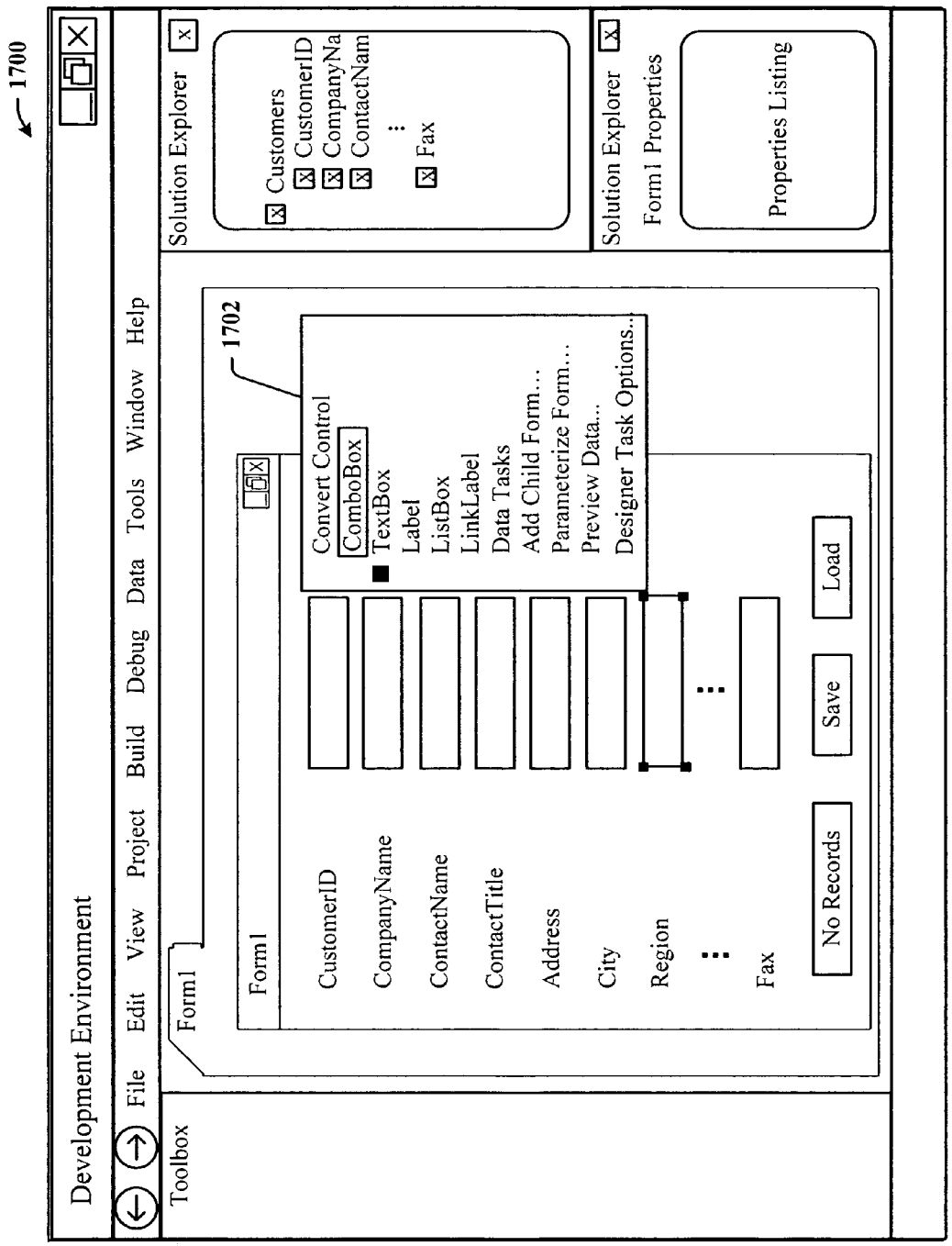
FIG. 17 illustrates a window showing a smart task menu for changing a control type from a textbox to combobox.

Referring now to FIG. 17, there is illustrated a window 1700 showing a smart task menu 1702 for changing a control type Region from a textbox to combobox. The menu 1702 indicates that the current control type for Region is a textbox. After converting the Region control type from textbox to combobox, the properties originally associated with the textbox version are mapped to the combobox version of the Region control type. The data bindings and properties are transferred across during the conversion.

Figure 18:
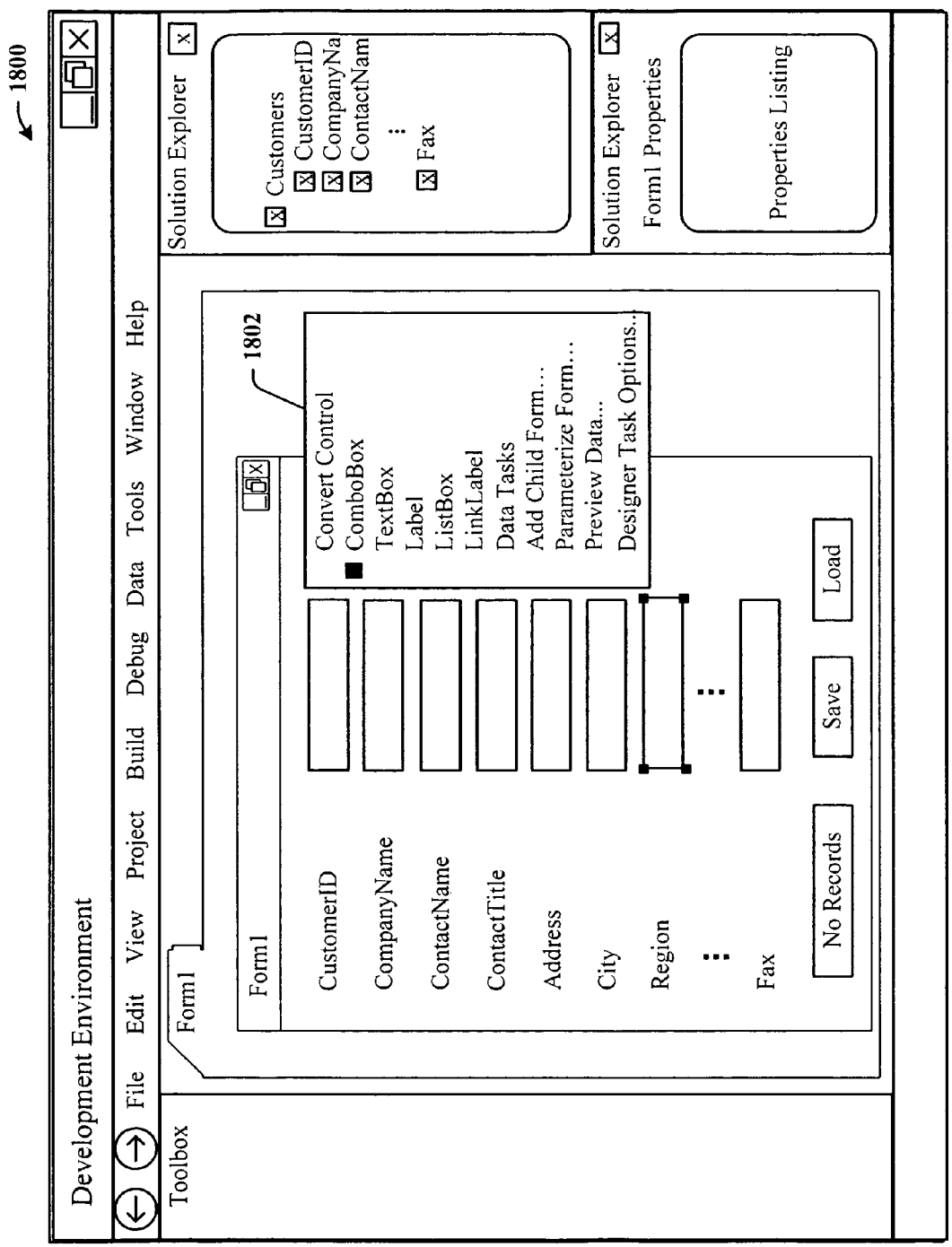
FIG. 18 illustrates a window showing a smart task menu indicating that the control type of FIG. 17 has been converted to a combobox type.

Referring now to FIG. 18, there is illustrated a window 1800 showing a smart task menu 1802 indicating that the control type of FIG. 17 has been converted to a combobox type.

Different controls have different ways that they are bound to data. For example, a text box is usually used to display text strings. If the user chooses to convert a textbox control type to a DateTimePicker, the properties are not exactly, and the conversion is not sufficiently reliable. A mapping engine of the development environment is populated with expected conversions. Metadata is added to the control(s) to indicate to the mapping engine how the control is expected to bound or mapped to the data entity.

The user can create controls or edit existing controls. The new control can be tagged with an attribute that a property to use to bind the control to the data. The attribute is read, and the data source schema is checked to determine if the new custom control attribute is compatible. If so, the binding is attempted.

Three general cases of data binding include the following. If, for example, the attributes are identical, the binding will be successful and reliable. If in a second example, the conversion process is attempting to convert a string to a date/time format, the binding may work, if the string corresponds to date. Here, the system assumes the user knows what he or she is doing. The development system can be configured to provide a message to the user that the binding occurred, but with qualifications. In a third example, of attempting to convert a bool to date/time, the conversion is guaranteed to a high degree of certainty not to work. However, the binding process will attempt to convert as much as possible, without success. Again, the system can provide a message to the user that the binding occurred, but with qualifications. Alternatively, the system can also allow the user to perform the binding manually or present a choice to the user.

Where the user develops a new control type in an unknown format, the user is allowed to choose the mapping for the control. Thus, the database or library of control types is extensible. There are several ways of customizing an existing control. One way is to extend an existing control. For example, the user can a text box control in association with a data entity but choose to allow only numeric values from the data entity. In another example, the user can create a second custom control looking at the same data entity, but allowing the full data string. The tool includes an options page to configure controls, and an XML (eXtensible Markup Language) file in which the configuration is stored by the development environment. Users do not need to deal directly with the file.

As indicated herein, the user can create groups of controls. Different groups of control could be used to look at same data in a different way, or look at only subsets of the data in the same way or differently.

The development system that employs controls conversion in accordance with the present invention is suitably robust to import watermarks, logos, and other controls for custom use by user in the UI. Watermarks and logos of a data source can be mapped to by the user setting attributes in the metadata of a control type that indicated the control can bind to such data. The default properties for such a control type can include providing sufficient UI surface to properly expose the watermark or logo.

Figure 19:
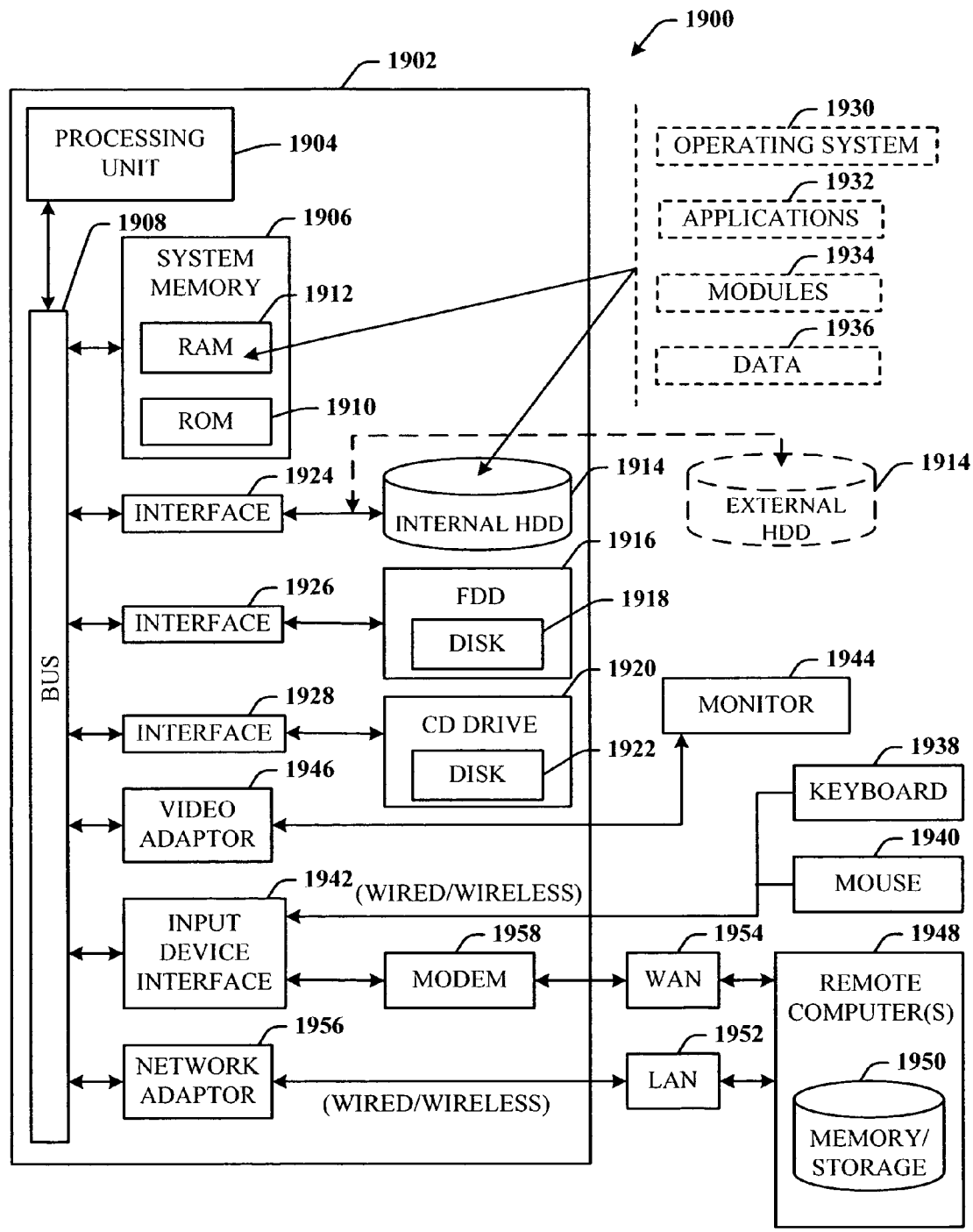
FIG. 19 illustrates a block diagram of a computer operable to execute the disclosed architecture.

Referring now to FIG. 19, there is illustrated a block diagram of a computer operable to execute the disclosed architecture. In order to provide additional context for various aspects of the present invention, FIG. 19 and the following discussion are intended to provide a brief, general description of a suitable computing environment 1900 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 19, there is illustrated an exemplary environment 1900 for implementing various aspects of the invention that includes a computer 1902, the computer 1902 including a processing unit 1904, a system memory 1906 and a system bus 1908. The system bus 1908 couples system components including, but not limited to, the system memory 1906 to the processing unit 1904. The processing unit 1904 may be any of various commercially available processors. Dual microprocessors and other multi-processor architectures may also be employed as the processing unit 1904.

The system bus 1908 can be any of several types of bus structure that may further interconnect to a memory bus (with or without a memory controller), a peripheral bus, and a local bus using any of a variety of commercially available bus architectures. The system memory 1906 includes read only memory (ROM) 1910 and random access memory (RAM) 1912. A basic input/output system (BIOS) is stored in a non-volatile memory 1910 such as ROM, EPROM, EEPROM, which BIOS contains the basic routines that help to transfer information between elements within the computer 1902, such as during start-up. The RAM 1912 can also include a high-speed RAM such as static RAM for caching data.

The computer 1902 further includes an internal hard disk drive (HDD) 1914 (e.g., EIDE, SATA), which internal hard disk drive 1914 may also be configured for external use in a suitable chassis (not shown), a magnetic floppy disk drive (FDD) 1916, (e.g., to read from or write to a removable diskette 1918) and an optical disk drive 1920, (e.g., reading a CD-ROM disk 1922 or, to read from or write to other high capacity optical media such as the DVD). The hard disk drive 1914, magnetic disk drive 1916 and optical disk drive 1920 can be connected to the system bus 1908 by a hard disk drive interface 1924, a magnetic disk drive interface 1926 and an optical drive interface 1928, respectively. The interface 1924 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 1912, including an operating system 1930, one or more application programs 1932, other program modules 1934 and program data 1936. All or portions of the operating system, applications, modules, and/or data can also be cached in the RAM 1912.

It is appreciated that the present invention can be implemented with various commercially available operating systems or combinations of operating systems.

A user can enter commands and information into the computer 1902 through one or more wired/wireless input devices, e.g., a keyboard 1938 and a pointing device, such as a mouse 1940. Other input devices (not shown) may include a microphone, an IR remote control, a joystick, a game pad, a stylus pen, touch screen, or the like. These and other input devices are often connected to the processing unit 1904 through an input device interface 1942 that is coupled to the system bus 1908, but may be connected by other interfaces, such as a parallel port, an IEEE 1394 serial port, a game port, a USB port, an IR interface, etc.

A monitor 1944 or other type of display device is also connected to the system bus 1908 via an interface, such as a video adapter 1946. In addition to the monitor 1944, a computer typically includes other peripheral output devices (not shown), such as speakers, printers etc.

The computer 1902 may operate in a networked environment using logical connections via wired and/or wireless communications to one or more remote computers, such as a remote computer(s) 1948. The remote computer(s) 1948 may be a workstation, a server computer, a router, a personal computer, portable computer, microprocessor-based entertainment appliance, a peer device or other common network node, and typically includes many or all of the elements described relative to the computer 1902, although, for purposes of brevity, only a memory storage device 1950 is illustrated. The logical connections depicted include wired/wireless connectivity to a local area network (LAN) 1952 and/or larger networks, e.g., a wide area network (WAN) 1954. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1902 is connected to the local network 1952 through a wired and/or wireless communication network interface or adapter 1956. The adaptor 1956 may facilitate wired or wireless communication to the LAN 1952, which may also include a wireless access point disposed thereon for communicating with the wireless adaptor 1956. When used in a WAN networking environment, the computer 1902 can include a modem 1958, or is connected to a communications server on the LAN, or has other means for establishing communications over the WAN 1954, such as by way of the Internet. The modem 1958, which may be internal or external and a wired or wireless device, is connected to the system bus 1908 via the serial port interface 1942. In a networked environment, program modules depicted relative to the computer 1902, or portions thereof, may be stored in the remote memory/storage device 1950. It will be appreciated that the network connections shown are exemplary and other means of establishing a communications link between the computers may be used.

The computer 1902 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 20:
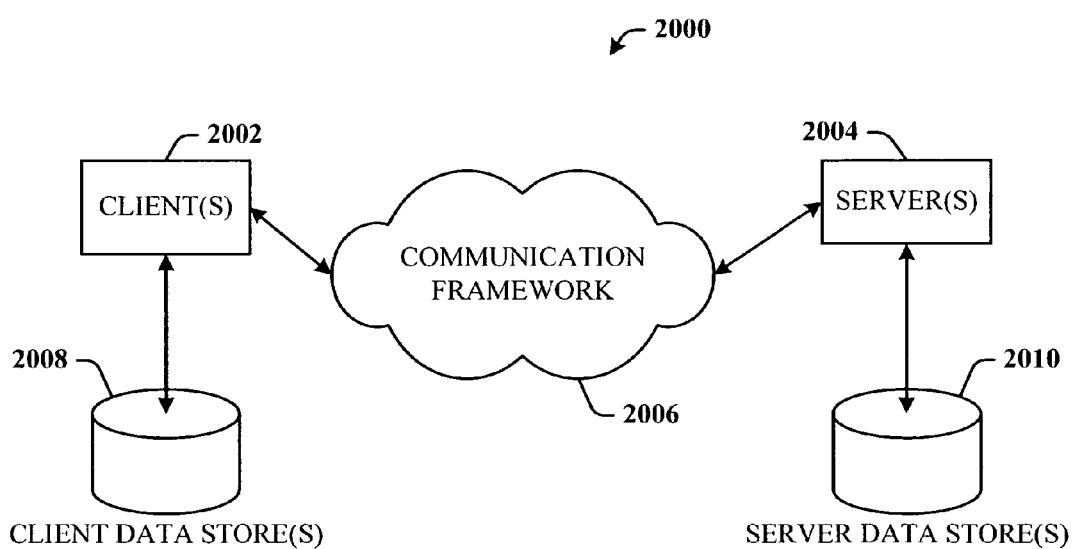
FIG. 20 illustrates a schematic block diagram of an exemplary computing environment in accordance with the present invention.

Referring now to FIG. 20, there is illustrated a schematic block diagram of an exemplary computing environment 2000 in accordance with the present invention. The system 2000 includes one or more client(s) 2002. The client(s) 2002 can be hardware and/or software (e.g., threads, processes, computing devices). The client(s) 2002 can house cookie(s) and/or associated contextual information by employing the present invention, for example. The system 2000 also includes one or more server(s) 2004. The server(s) 2004 can also be hardware and/or software (e.g., threads, processes, computing devices). The servers 2004 can house threads to perform transformations by employing the present invention, for example. One possible communication between a client 2002 and a server 2004 may be in the form of a data packet adapted to be transmitted between two or more computer processes. The data packet may include a cookie and/or associated contextual information, for example. The system 2000 includes a communication framework 2006 (e.g., a global communication network such as the Internet) that can be employed to facilitate communications between the client(s) 2002 and the server(s) 2004.

Communications may be facilitated via a wired (including optical fiber) and/or wireless technology. The client(s) 2002 are operably connected to one or more client data store(s) 2008 that can be employed to store information local to the client(s) 2002 (e.g., cookie(s) and/or associated contextual information). Similarly, the server(s) 2004 are operably connected to one or more server data store(s) 2010 that can be employed to store information local to the servers 2004.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A program storage medium readable by a computer having a memory and a processor, the medium tangibly embodying one or more programs of instructions executable by the computer to implement a system that facilitates conversion of a user interface control in an application development environment, comprising:

a generation component that facilitates the use of the user interface (UI) control in the application; and a conversion component that performs the following:

displays a set of control types or control group views that are supported for at least one of control conversion or data binding;

converts the UI control from a first control having a first control type to a new, second control having a new second control type based on a user's selection, the conversion of the UI control from the first control to the new control including:

determining that a property name and a property type of a first property of the first control matches a property name and a property type of a first property of the new control;

in response to determining that the property name and the property type of the first property of the first control matches the property name and the property type of the first property of the new control, setting a value of the first property of the new control to a value of the first property of the first control;

determining that an event name and type of a first event field of the first control matches an event name and type of a first event field of the new control;

in response to determining that the event name and type of the first event field of the first control matches the event name and type of the first event field of the new control;

creating a new event hookup that binds the first event field in the new control to a first event handler method that was bound to the first event field in the first control by a old event hookup; and removing the old event hookup;

determining that an event name and type of a second event field of the first control does not match any event name and type of any event field of the new control; and in response to determining that the event name and type of the second event field of the first control does not match any event name and type of any event field of the new control:

removing an event hookup that bound a second event handler method to the second event field of the first control; and preserve the second event handler method;

changes the display of a form displaying the control types between a grid form and a details form; and displays a smart tag local to the control type if the control type is capable of at least one of data binding or conversion.

2. The system of claim 1, the conversion component is part of the generation component.

3. The system of claim 1, the conversion component maps all compatible control states and bindings from the control to the new control.

4. The system of claim 1, the control is converted to the new control immediately after creation of the control.

5. The system of claim 1, the control is converted to the new control after creation of the application.

6. The system of claim 1, the conversion component inspects the control for data binding and conversion capability.

7. The system of claim 1, the control is one of a group of related controls, wherein the group of related controls are converted by the conversion component to a group of new controls.

8. The system of claim 7, the conversion component maintains data bindings of the group of controls across the conversion process to the group of new controls.

9. The system of claim 1, the application development environment includes a creation of a user interface (UI) in which the control is employed.

10. A method of processing a UI control in an application development environment, comprising:

inputting the UI control into the environment, the UI control is retained in a memory;

displaying, on a display device, the UI control on a form representing the environment, the form facilitating display of the control types on a grid form representation and a details form representation;

inspecting, via a processor, the UI control for data binding and conversion capability;

associating the UI control with a schema of a data source;

displaying a smart tag for the UI control if the UI control is supported for at least one of control conversion or data binding;

converting the UI control from a first control having a first UI control type to a new, second control having a new, second UI control type based on the user's selection, the conversion of the UI control from the first control to the new control including:

determining that a property name and a property type of a first property of the first control matches a property name and a property type of a first property of the new control;

in response to determining that the property name and the property type of the first property of the first control matches the property name and the property type of the first property of the new control, setting a value of the first property of the new control to a value of the first property of the first control;

determining that an event name and type of a first event field of the first control matches an event name and type of a first event field of the new control;

in response to determining that the event name and type of the first event field of the first control matches the event name and type of the first event field of the new control:

creating a new event hookup that binds the first event field in the new control to a first event handler method that was bound to the first event field in the first control by a old event hookup; and removing the old event hookup;

determining that an event name and type of a second event field of the first control does not match any event name and type of any event field of the new control; and in response to determining that the event name and type of the second event field of the first control does not match any event name and type of any event field of the new control:

removing an event hookup that bound a second event handler method to the second event field of the first control; and preserving the second event handler method; and automatically inputting the control into the environment in response to a user gesture, the gesture is related to one of a drag-and-drop of the schema into the environment and a download of the schema into the environment.

11. The method of claim 10, the data source is at least one of a database, web service, and object.

12. The method of claim 10, further comprising exposing to a user at least one of the one or more characteristics of the control.

13. The method of claim 10, further comprising automatically inputting a type of the control into the environment based on a type of the schema.

14. The method of claim 10, the control is one of a simple control, complex control, list control, and user-provided conversions.

15. The method of claim 10, further comprising reversing the act of converting to a stable point with an undo function.

16. A method of processing a UI control in an application development environment, the method comprising:

inputting the UI control into the environment, the UI control is retained in a memory, the environment is represented as a form on a display device;

selecting a data entity of a data source;

binding, through employing a processor, the UI control to the data entity;

presenting on the form a list of control types or control group views that are supported for control conversion and data binding, the control types of control group views are retained in a memory;

presenting local to the control type or control group view at least one smart tag indicating other control types or control group views that support data binding or data conversion with the selected data source;

converting, via a processor, the UI control from a first control having a first UI control type to a new, second control having a new, second UI control type based on the user's selection of the smart tag while the UI control is bound to the data entity, the conversion of the UI control from the first control to the new control including:

determining that a property name and a property type of a first property of the first control matches a property name and a property type of a first property of the new control;

in response to determining that the property name and the property type of the first property of the first control matches the property name and the property type of the first property of the new control, setting a value of the first property of the new control to a value of the first property of the first control;

determining that an event name and type of a first event field of the first control matches an event name and type of a first event field of the new control;

in response to determining that the event name and type of the first event field of the first control matches the event name and type of the first event field of the new control:

creating a new event hookup that binds the first event field in the new control to a first event handler method that was bound to the first event field in the first control by a old event hookup; and removing the old event hookup;

determining that an event name and type of a second event field of the first control does not match any event name and type of any event field of the new control; and in response to determining that the event name and type of the second event field of the first control does not match any event name and type of any event field of the new control:

removing an event hookup that bound a second event handler method to the second event field of the first control; and preserving the second event handler method.

17. The method of claim 16, further comprising inputting a customized control by associating an attribute with the customized control.

18. The method of claim 16, further comprising signaling a user if the act of converting fails.

19. The method of claim 16, further comprising associating metadata with the control to facilitate the act of binding the control to the data entity.

20. The method of claim 16, further comprising associating metadata with the control to facilitate the act of converting the control, that is data bound, to the new control.

21. A system to facilitate the processing a UI control in an application development environment, comprising:
- means for utilizing a processor to facilitate inputting the UI control into the environment, where the environment is represented as a form on a display device, the form can be displayed as a grid form representation and a details form representation;
- means for mapping the UI control with a schema of a data source;
- means for displaying on the form a set of control types or control group views that are supported for at least one of control conversion or data binding;
- means for converting the UI control from a first control having a first UI control type to a new, second control having a new, second UI control type based on the user's selection, the conversion of the UI control from the first control to the new control including:
  - determining that a property name and a property type of a first property of the first control matches a property name and a property type of a first property of the new control;
  - in response to determining that the property name and the property type of the first property of the first control matches the property name and the property type of the first property of the new control, setting a value of the first property of the new control to a value of the first property of the first control;
  - determining that an event name and type of a first event field of the first control matches an event name and type of a first event field of the new control;
  - in response to determining that the event name and type of the first event field of the first control matches the event name and type of the first event field of the new control:
    - creating a new event hookup that binds the first event field in the new control to a first event handler method that was bound to the first event field in the first control by a old event hookup; and
    - removing the old event hookup;
  - determining that an event name and type of a second event field of the first control does not match any event name and type of any event field of the new control; and
  - in response to determining that the event name and type of the second event field of the first control does not match any event name and type of any event field of the new control:
    - removing an event hookup that bound a second event handler method to the second event field of the first control; and
    - preserving the second event handler method.

22. The system of claim 21, further comprising means for inspecting the control for compatibility with data binding and conversion.

23. The system of claim 21, the means for mapping uses metadata of the control that indicates how the control should bind to the schema.

24. The system of claim 21, the means for inputting is an options page.

25. The system of claim 21, the data source is at least one of a database, web service, and object, and each data source can be represented by the corresponding schema extrapolated from the source.

26. The system of claim 21, the means for converting facilitates changing from a view of a grid form to a view of a details form.

27. The system of claim 21, the means for inputting is an XML file.

28. The system of claim 21, a data source can be a list of elements which can be dragged and dropped onto the form.

29. The system of claim 28, each element in the list is automatically displayed as a separate element on the form.

30. The system of claim 29, a control type is automatically associated with each element on the form.

* * * * *